US010485258B2

(12) United States Patent
Raskin et al.

(10) Patent No.: US 10,485,258 B2
(45) Date of Patent: Nov. 26, 2019

(54) PRODUCTION OF ENRICHED PRODUCTS

(75) Inventors: Ilya Raskin, Manalapan, NJ (US); Diana Roopchand, Highland Park, NJ (US)

(73) Assignee: BOARD OF TRUSTEES, RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 235 days.

(21) Appl. No.: 14/398,294

(22) PCT Filed: Sep. 7, 2012

(86) PCT No.: PCT/US2012/054094
§ 371 (c)(1),
(2), (4) Date: May 15, 2015

(87) PCT Pub. No.: WO2013/165455
PCT Pub. Date: Nov. 7, 2013

(65) Prior Publication Data
US 2015/0245645 A1    Sep. 3, 2015

Related U.S. Application Data

(60) Provisional application No. 61/640,917, filed on May 1, 2012.

(51) Int. Cl.
*A23L 33/105* (2016.01)
*A23L 2/02* (2006.01)
*A23L 2/52* (2006.01)
*A21D 2/36* (2006.01)
*A21D 10/00* (2006.01)

(52) U.S. Cl.
CPC ............... *A23L 33/105* (2016.08); *A21D 2/36* (2013.01); *A21D 10/005* (2013.01); *A23L 2/02* (2013.01); *A23L 2/52* (2013.01); *A23V 2002/00* (2013.01)

(58) Field of Classification Search
CPC ........ A21D 2/36; A23D 10/005; A23L 33/105
See application file for complete search history.

(56) References Cited

U.S. PATENT DOCUMENTS

| | | |
|---|---|---|
| 5,744,161 A | 4/1998 | Majeed et al. |
| 6,426,112 B1 | 7/2002 | Boatright |
| 6,544,581 B1 | 4/2003 | Shrikhande et al. |
| 7,667,004 B2 | 2/2010 | Zhong et al. |
| 2002/0001651 A1 | 1/2002 | Norris et al. |
| 2002/0136783 A1 | 9/2002 | Singh et al. |
| 2002/0168429 A1 | 11/2002 | Mann |
| 2002/0197303 A1 | 12/2002 | Kim |
| 2003/0022838 A1 | 1/2003 | Sheppard et al. |
| 2003/0072827 A1 | 4/2003 | Steenbergen |
| 2003/0235559 A1 | 12/2003 | Sobol et al. |
| 2004/0161524 A1 | 8/2004 | Sakai et al. |
| 2006/0134286 A1 | 6/2006 | Maeda |
| 2007/0196557 A1 | 8/2007 | Weissman et al. |
| 2007/0202195 A1 | 8/2007 | Wang et al. |
| 2007/0286938 A1 | 12/2007 | Saiki et al. |
| 2008/0213441 A1 | 9/2008 | Ludwig et al. |
| 2008/0226802 A1 | 9/2008 | Lee |
| 2010/0015306 A1 | 1/2010 | Pereyra |
| 2010/0021615 A1 | 1/2010 | Sato et al. |
| 2010/0055248 A1 | 3/2010 | Woelfel et al. |
| 2011/0117247 A1 | 5/2011 | Russell et al. |

FOREIGN PATENT DOCUMENTS

WO    WO-2011/115910 A1    9/2011

OTHER PUBLICATIONS

Crozier et al., Dietary phenolics: chemistry, bioavailability and effects on health, *Nat. Prod. Reports*, 26:1001-43 (2009).
Enna et al., Current Protocols in Pharmacology, J. Wiley & Sons, New York, N.Y.
Lee et al., Determination of total monomeric anthocyanin pigment content of fruit juices, beverages, natural colorants, and wines by the pH differential method: collaborative study, *J. AOAC Int.*, 88:1269 (2005).
Pham et al., Skim milk powder supplementation affects lactose utilization, microbial survival and biotransformation of isoflavone glycosides to isoflavone aglycones in soymilk by Lactobacillus, *Food Microbiol.*, 25:653-61 (2008).
Prior et al., Multi-laboratory validation of a standard method for quantifying proanthocyanidins in cranberry powders, *J. Sci. Food. Agric.*, 90:1473-8 (2010).
Raskin et al., Can an apple a day keep the doctor away?, *Curr. Pharm. Design*, 10:3419-29 (2004).
Roopchand et al., Efficient sorption of polyphenols to soybean flour enables natural fortification of foods, *Food Chem.*, 131(4):1193-200 (2012).
Schmidt et al., A natural history of botanical therapeutics, *Met.*, 57:S3-S9 (2008).
Schmidt et al., Revisiting the ancient concept of botanical therapeutics, *Nat. Chem. Biol.*, 3:360-6 (2007).
Singleton et al., Colorimetry of total phenolics with phosphomolybdic-phosphotungstic acid reagents, *Am. J. Enol. Vitic.*, 16:144-58 (1965).
Smith et al., Effects of repeated doses of caffeine on mood and performance of alert and fatigued volunteers, *J. Psychopharmacol.*, 19(6):620-6 (2005).
Sun et al., Critical factors of vanillin assay for catechins and proanthocyanidins, *J. Agric. Food Chem.*, 46:4267-74 (1998).
Tomarelli et al., The use of azoalbumin as a substrate in the colorimetric determination or peptic and tryptic activity, *J. Lab. Clin. Med.*, 34(3):428-33 (1949).
Wang et al., An LC-MS method for analyzing total resveratrol in grape juice, cranberry juice, and in wine, *J. Agric. Food Chem.*, 50:431-5 (2002).
International Preliminary Report on Patentability for International Application No. PCT/US2012/54096, dated Mar. 12, 2014.

(Continued)

*Primary Examiner* — Elizabeth Gwartney
(74) *Attorney, Agent, or Firm* — Marshall, Gerstein & Borun LLP

(57) ABSTRACT

The present disclosure provides methods for the production of enriched substances that can be used in the preparation of enriched food products, dietary supplements, medical foods, cosmetic products or pharmaceutical agents.

16 Claims, No Drawings

(56) References Cited

OTHER PUBLICATIONS

International Preliminary Report on Patentability, United States Patent Office, PCT/US12/54094, dated Nov. 4, 2014.
International Search Report and Written Opinion for International Application No. PCT/US2012/54096, dated Nov. 15, 2012.
International Search Report and Written Opinion of the International Search Authority, United States Patent Office, PCT/US12/54094, dated Dec. 3, 2012.

_US 10,485,258 B2_

PRODUCTION OF ENRICHED PRODUCTS

CROSS-REFERENCE TO RELATED APPLICATION

The present application claims the benefit of priority to U.S. Provisional Application No. 61/640,917, filed May 1, 2012, the disclosure of which is hereby incorporated by reference in its entirety.

FIELD OF THE INVENTION

The present invention is directed to methods for the production of an enriched substance comprising a plant-derived component and a ground edible material and the incorporation of the enriched substance into enriched products, such as enriched food products, enriched dietary supplement products, enriched medical food products, enriched cosmetic products and enriched pharmaceutical products.

BACKGROUND OF THE INVENTION

It is known that many foods contain numerous health/wellness-promoting and disease-preventing/curing compounds (Schmidt et al., Nat. Chem. Biol., 3:360-366, 2007; Raskin et al., Curr. Pharm. Design, 10:3419-3429, 2004). Plants are a particularly rich source of such compounds. Unfortunately, the co-evolution of people and edible plants and the advance of modern agriculture have favored the reduction of beneficial, bioactive products in plant foods (Schmidt et al., Met. Clin. Exp., 57:S3-S9, 2008). Extensive plant breeding and selection has reduced the content of healthy ingredients, such as various antioxidants, polyphenols, bioflavonoids, glucosinolates, healthy fibers, fatty acids, vitamins, and minerals in most plant foods. This reduction was caused by the need to maximize the caloric content, palatability, and digestibility of plant foods by directing plant metabolism to accumulating starches, sugars, oils, and/or major proteins in edible parts at the expense of losing bioactive secondary metabolites. As a result, many health-promoting and disease-fighting products and bioactives were reduced to levels where average daily consumption cannot produce measurable health benefits. To supply a beneficial amount of plant-derived bioactives, food plants are then extracted with solvents and sold in oral form as concentrated supplements Exemplary approaches to concentrating bioactives include the use of ion-exchange or affinity chromatography, which can be used for concentrating and isolating a great variety of compounds. It is based on specific electrostatic interactions between charges on the surface of compounds in a mobile fluid phase and solid ion exchangers (resins). As a result, some compounds bind to the ion exchange matrix, while others remain in the solution. Ion-exchangers and compounds should be in the same polarity range to effectively bind to each other. However, ion-exchange chromatography is very expensive because it uses synthetic resins and organic solvents to elute bound phytochemicals from resins. In addition to high cost, this method is often not allowed in food manufacturing and cannot be called "natural" or "organic."

SUMMARY OF THE INVENTION

Described herein is a method of making an enriched product comprising a plant-derived component, the method comprising combining plant juice with a ground edible material to form an admixture, wherein the plant-derived component is sorbed to the ground edible material; drying the admixture, thereby producing an enriched substance comprising the plant-derived component from the plant juice and the ground edible material; and incorporating the enriched substance into a product, thereby making an enriched product comprising the plant-derived component from the plant material.

In some embodiments, the enriched product is selected from the group consisting of an enriched food product, an enriched dietary supplement product, an enriched medical food product, an enriched cosmetic product and an enriched pharmaceutical product.

In some embodiments, the enriched food product is a baked good (including, but not limited to, breads, cookies, muffins, crackers, scones, cereal). In some embodiments, the enriched food product is a beverage (e.g., a smoothie, a water or dairy beverage, or a soy-based beverage). In embodiments, the enriched food product is a bar. In some embodiments, the enriched food product is a medical food.

In some embodiments, the plant juice comprises material that has been homogenized, extracted, pressed, squeezed or juiced from a plant or plant part.

The plant juice, in some embodiments, is a plant extract. The plant extract is optionally produced by contacting plant material with an extractant fluid at a pH less than pH 4, incubating the plant material in the extractant fluid for a time sufficient to extract a plant-derived component and collecting the fluid to obtain a plant extract comprising the plant-derived component.

The plant extract can be produced from any plant material. In some embodiments, the extract is produced from a plant material selected from the group consisting of bark, a flower, a berry, a seed, a root, a nut, a leaf, a stem and mixtures thereof. In some embodiments, the plant extract is produced from pomace (including, but not limited to, cranberry pomace, grape pomace, maqui pomace or blueberry pomace).

In some embodiments, the ground edible material is a plant flour. In some embodiments, the flour is selected from the group consisting of soybean flour, wheat flour, almond flour, amaranth flour, brown rice flour, buckwheat flour, cassava flour, chestnut flour, chickpea flour, chuno flour, corn flour, cornstarch, glutinous rice flour, noodle flour, hazelnut flour, walnut flour, pea flour, peanut flour, potato starch flour, rice flour, rye flour, tapioca flour, teff flour, arrowroot flour, taro flour, quinoa flour, mulga flour, ironweed flour, umbrella bush flour, tjuntjula flour, wakalpulka flour, witchetty bush flour, wiry wattle flour, Mitchell grass flour, nardoo flour, coconut flour, old man saltbush flour and wangunu flour.

In some embodiments, the ground edible material is selected from the group consisting of wheat bran, wheat germ, oat bran, rice bran and rice germ.

The use of other ground edible materials such as protein powder, including, but not limited to, milk powder, egg powder, whey protein, gluten and yeast powder, and cellulose-or chitin-containing material including, but not limited to, non-soluble vegetable fibers is also contemplated.

Also contemplated are the embodiments provided in the numbered paragraphs below:

1. A method of making an enriched product comprising a plant-derived component, the method comprising:

(a) combining plant juice with a ground edible material to form an admixture wherein the plant-derived component is sorbed to the ground edible material;

(b) drying the admixture, thereby producing an enriched substance comprising the plant-derived component from the plant juice and the ground edible material; and (c) incorporating the enriched substance into a product, thereby making an enriched product comprising the plant-derived component.

2. The method of paragraph 1, wherein the enriched product is selected from the group consisting of an enriched food product, an enriched dietary supplement product, an enriched medical food product, an enriched cosmetic product and an enriched pharmaceutical product.

3. The method of paragraph 1 or paragraph 2, wherein the enriched product is an enriched food product.

4. The method of paragraph 3, wherein the food product is selected from the group consisting of a baked good, a beverage, and a bar.

5. The method of paragraph 1, wherein the plant juice is a plant extract.

6. The method of paragraph 5, wherein the plant extract is produced by contacting plant material with an extractant fluid at a pH less than pH 4, incubating the plant material in the extractant fluid for a time sufficient to extract a plant-derived component and collecting the fluid to obtain a plant extract comprising the plant-derived component.

7. The method of paragraph 6, wherein the plant material is selected from the group consisting of bark, a flower, a berry, a seed, a root, a nut, a leaf, a stem and mixtures thereof.

8. The method of paragraph 6, wherein the plant material is pomace.

9. The method of paragraph 8, wherein the pomace is cranberry pomace, grape pomace, maqui pomace or blueberry pomace.

10. The method of paragraph 1, wherein the plant-derived component is a polyphenol.

11. The method of paragraph 10, wherein the polyphenol is selected from the group consisting of an anthocyanin and a proanthocyanidin.

12. The method of paragraph 1, wherein the ground edible material is a plant flour.

13. The method of paragraph 12, wherein the plant flour is selected from the group consisting of soybean flour, soy protein isolate, wheat flour, almond flour, amaranth flour, brown rice flour, ota flour, buckwheat flour, cassava flour, chestnut flour, chickpea flour, chuno flour, corn flour, cornstarch, glutinous rice flour, noodle flour, hazelnut flour, walnut flour, pea flour, bean flour, peanut flour, potato starch flour, rice flour, rye flour, tapioca flour, teff flour, arrowroot flour, taro flour, quinoa flour, mulga flour, ironweed flour, umbrella bush flour, tjuntjula flour, wakalpulka flour, witchetty bush flour, wiry wattle flour, Mitchell grass flour, nardoo flour, coconut flour, old man saltbush flour and wangunu flour.

14. The method of paragraph 1, wherein the ground edible material is selected from the group consisting of soybean flour, soy protein isolate, pea protein isolate, wheat bran, wheat germ, rice bran, rice germ and oat bran.

15. The method of paragraph 1, wherein the ground edible material is selected from the group consisting of milk powder, egg powder, whey protein, casein protein, gluten and yeast powder.

16. An enriched product produced by the method of paragraph 1.

17. The enriched product of paragraph 16, that is an enriched food product, an enriched dietary supplement product, an enriched medical food product, an enriched cosmetic product or an enriched pharmaceutical product.

18. An enriched substance produced by a method comprising (a) combining plant juice with a ground edible material to form an admixture wherein the plant-derived component is sorbed to the ground edible material; and (b) drying the admixture, thereby producing an enriched substance comprising the plant-derived component from the plant juice and the ground edible material.

19. The method of paragraph 18, wherein the plant juice is a plant extract.

20. The method of paragraph 19, wherein the plant extract is produced by contacting plant material with an extractant fluid at a pH less than pH 4, incubating the plant material in the extractant fluid for a time sufficient to extract a plant-derived component and collecting the fluid to obtain a plant extract comprising the plant-derived component.

21. The method of paragraph 20, wherein the plant material is selected from the group consisting of bark, a flower, a berry, a seed, a root, a nut, a leaf, a stem and mixtures thereof.

22. The method of paragraph 20, wherein the plant material is pomace.

23. The method of paragraph 22, wherein the pomace is cranberry pomace, grape pomace, maqui pomace or blueberry pomace.

24. The method of paragraph 18, wherein the plant-derived component is a polyphenol.

25. The method of paragraph 24, wherein the polyphenol is selected from the group consisting of an anthocyanin and a proanthocyanidin.

26. The method of paragraph 18, wherein the ground edible material is a plant flour.

27. The method of paragraph 26, wherein the plant flour is selected from the group consisting of soybean flour, soy protein isolate, wheat flour, almond flour, amaranth flour, brown rice flour, ota flour, buckwheat flour, cassava flour, chestnut flour, chickpea flour, chuno flour, corn flour, cornstarch, glutinous rice flour, noodle flour, hazelnut flour, walnut flour, pea flour, bean flour, peanut flour, potato starch flour, rice flour, rye flour, tapioca flour, teff flour, arrowroot flour, taro flour, quinoa flour, mulga flour, ironweed flour, umbrella bush flour, tjuntjula flour, wakalpulka flour, witchetty bush flour, wiry wattle flour, Mitchell grass flour, nardoo flour, coconut flour, old man saltbush flour and wangunu flour.

28. The method of paragraph 18, wherein the ground edible material is selected from the group consisting of soybean flour, soy protein isolate, pea protein isolate, wheat bran, wheat germ, rice bran, rice germ and oat bran.

29. The method of paragraph 18, wherein the ground edible material is selected from the group consisting of milk powder, egg powder, whey protein, casein protein, gluten and yeast powder.

In any of the ranges described herein, the endpoints of the range are included in the range. Additional features and variations of the disclosure will be apparent to those skilled in the art from the entirety of this application and all such features are intended as aspects of the disclosure. Likewise, features of the disclosure described herein can be re-combined into additional embodiments that also are intended as aspects of the disclosure, irrespective of whether the combination of features is specifically mentioned above as an aspect or embodiment of the disclosure. Also, only such limitations as are described herein to be critical to the disclosure should be viewed as such; variations of the invention lacking limitations which have not been described herein as critical are intended as aspects of the disclosure.

DETAILED DESCRIPTION OF THE INVENTION

Definitions

A "plant-derived component" as used herein refers to a compound present in a plant juice for which enrichment or concentration is desired. Exemplary plant-derived components include, but are not limited to, a polyphenol, an alkaloid, a terpenoid, a steroid, a sesquiterpene lactone, a gingerol, a glucosinolate, a sulforaphane, an isothiocyanate and a carotenoid.

The term "plant juice" refers to plant material that has been homogenized, extracted (including extractions obtained by the extraction methods performed at a reduced pH as described herein), pressed, squeezed or juiced from a plant or plant part. "Plant juice" also refers to plant material that is made into teas, infusions, tinctures, suspensions, emulsions and combinations thereof that are made from plant material. In one embodiment, the plant juice may be prepared by drawing out, withdrawing, distilling or otherwise separating one substance from another by a chemical or physical process. The plant material will typically be fragmented by slicing, pulverizing, grinding or by any other technique known in the art to increase surface area and thereby facilitate exposure to a fluid such as a solvent (e.g., water or alcohol) in preparation of a plant juice. Plant juice is understood to comprise phenolic compounds (e.g., polyphenols, anthocyanins, and proanthocyanidins or hydrolyzable tannins).

The term "plant" or "plant material" refers to whole plants and plant parts and, as used herein, refers to higher, or vascular, plants (gymnosperms and angiosperms, including plants providing fruits and vegetables, as well as medicinal plants), lower, or non-vascular, plants (e.g., algae and fungi), and unicellular yeast. Exemplary plant parts (with respect to vascular plants) include, but are not limited to, bark, a flower (or petal thereof), a tuber, a stem or shoot, a root, a fruit, a berry, a seed, a nut and a leaf of a plant.

The term "extract" may be a single extract obtained from a particular extraction step or series of extraction steps or the extract may be a combination of extracts obtained from separate extraction steps. Such combined extracts are thus also encompassed by the term "extract."

"Extractant fluids" are fluids for use in extraction methods, and include water and well-known organic solvents such as, but not limited to, alcohols, alkanes, halocarbons, ethers, aromatic solvents, ketones, aqueous solvents, esters, and supercritical fluids. In one embodiment, ethanol is used to prepare a plant extract that yields a plant juice according to the disclosure. Like water, a benefit of incorporating an ethanolic solvent in the final extraction step is that an ethanolic solvent is compatible with an ingestible product, and therefore is suitable for incorporation into a pill, capsule, tablet, and other ingestible forms known in the art.

The term "ground edible material" as used herein refers to any edible solid material that has been processed to increase its surface area, such as by grinding or milling by methods known in the art. In some embodiments, the ground edible material is derived from a plant or microbe that has been processed to increase its surface area, such as by shearing, grinding, pulverizing or milling, using any method known in the art. Grinding, milling, or pulverizing plant material is preferred because it greatly increases the surface area of the edible material. In some embodiments, the ground edible material is a plant flour. The use of other ground edible materials such as soybean protein concentrate, soybean protein isolate, protein powder (including, but not limited to, egg powder, milk powder, whey protein, casein protein, gluten and yeast powder) and cellulose-or chitin-containing material (including, but not limited to, non-soluble vegetable fibers) is also contemplated. In other embodiments, the ground edible material is a bran, produced from the outer layer of plant seeds. Bran includes, but is not limited to, wheat bran, corn bran, rice bran, oat bran and barley bran.

The term "enriched substance" as used herein refers to a composition of matter comprising one or more plant-derived components sorbed to a ground edible material.

As used herein, the term "sorb" refers to adsorb, absorb, or a combination thereof. Analogously, the term "sorption" refers to adsorption, absorption, or a combination thereof. "Sorption" is given the meaning it has acquired in the art, i.e., the taking up and holding of one substance by another, which includes the processes of adsorption and/or absorption. The term "adsorption," is given its ordinary meaning in referring to the physical adherence or association of one substance (e.g., a component present in a plant juice that becomes associated with another material) to the surface of another substance (e.g., a ground edible material). Also given its ordinary meaning in the art, "absorption" refers to the taking up or incorporation of one substance (e.g., a component present in a plant juice that becomes associated with another material) into another substance (e.g., a ground edible material). The term "desorption" refers to the converse process of sorption in which a substance (e.g., a component present in a plant juice that becomes associated with another material) is released from another substance (e.g., a ground edible material).

The term "admixture" as used herein refers to a composition produced by mixing or commingling compounds of the disclosure (for example and without limitation, mixing a plant extract and a ground edible material).

"Therapeutic agent" as used herein means any compound useful for a therapeutic purpose, and a "diagnostic agent" is any compound useful for a diagnostic purpose. The terms as used herein are understood to mean any compound that is administered to a patient for the treatment, including amelioration of any symptom of a condition or disease, or diagnosis, of a condition that can be used in combination with any of the products herein disclosed.

The term "food product" means any substance containing nutrients that can be ingested by an organism to produce energy, promote health and wellness, stimulate growth, and/or maintain life.

The term "enriched food product" as used herein refers to a food product that has been modified to include the enriched substance produced by a method described herein, which provides a benefit such as a health/wellness-promoting and/or disease-preventing/mitigating/treating property beyond the basic function of supplying nutrients.

The term "bar" as used herein refers to an enriched food product that has been formulated into a bar shape.

The term "meal replacement product" as used herein refers to an enriched food product that is intended to be eaten in place of a normal meal.

The term "dietary supplement" as used herein refers to a substance taken by mouth that contains a "dietary ingredient" intended to supplement the diet. The term "dietary ingredients" includes, but is not limited to, the plant-derived component(s) as defined herein.

The term "medical food" as used herein means a food containing a plant-derived component that is formulated to be consumed or administered under the supervision of a physician and which is intended for the specific dietary management of a disease or condition for which distinctive nutritional requirements, based on recognized scientific principles, are established by medical evaluation.

The term "cosmetic product" as used herein means a composition having an ingredient for a cosmetic, body care or hair care personal product having a positive effect on the physical condition of the body (e.g., skin, nails and hair).

The term "enriched cosmetic product" as used herein means a cosmetic product that has been modified to include the enriched substance produced by a method described herein.

The term "pharmaceutical product" as used herein refers to a product having an prophylactically or therapeutically effective amount of an ingredient which provides a benefit such as a health/wellness-promoting and/or disease-preventing/mitigating/treating property.

The term "enriched pharmaceutical product" as used herein means a pharmaceutical composition that has been modified to include the enriched substance produced by a method described herein.

The term "enriched product" collectively refers to an "enriched food product," an "enriched cosmetic product" and an "enriched pharmaceutical product" as those terms are defined herein.

The term "polyphenol" is often used to refer to plant phenolic compounds, which are characterized by the presence of more than one phenol unit or building block per molecule. Polyphenols are generally divided into hydrolyzable tannins and phenylpropanoids (derived from phenylalanine), such as lignin, flavonoids, and condensed tannins. Some polyphenols are not present in live plants but are formed during processing of foods and beverages, such as black tea fermentation, wine making, and coffee and cocoa production. Such polyphenols are often called "derived polyphenols."

Enriched Substance

One aspect of the disclosure is a method of producing an enriched substance comprising a ground edible material and a plant-derived component obtained from a plant material, such as plant juice. In some embodiments, the method comprises combining plant juice (e.g., a plant extract) with a ground edible material to form an admixture, wherein the plant-derived component in the plant juice is sorbed to the ground edible material; and drying the admixture, thereby producing an enriched substance comprising the plant-derived component and the ground edible material.

The plant-derived component (present in, for example and without limitation, a plant juice) is combined with a ground edible material by any means known in the art to form an admixture. In one embodiment, the combining step comprises a method selected from the group consisting of mixing, contacting, and/or putting together the plant juice with the ground edible material.

In some embodiments, the drying step is performed for a time period of about 30 minutes to about 24 hours. Drying the admixture, for about 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, or more, is specifically contemplated. The admixture can be dried in any drying apparatus known in the art including, but not limited to, a tray dryer, a vacuum oven or an oven. In some embodiments, the admixture is dried at a temperature of about 20° C., about 25° C., about 30° C., about 35° C., about 40°, about 45° C., about 50° C., about 55° C., about 60° C., about 65° C., or about 70° C.

Without wishing to be bound to any particular theory, it is contemplated that the plant-derived component in the plant juice is sorbed to the ground edible material. In some embodiments, at least 40% of the plant-derived component present in a plant juice is sorbed to the ground edible material. In other embodiments, at least 45%, at least 50%, at least 55%, at least 60%, at least 65%, at least 70%, at least 75%, at least 80%, at least 85%, at least 90%, at least 95%, at least 99% or at least 99.5% or more of the plant-derived component present in the extract is sorbed to the ground edible material. In some embodiments, the plant-derived component present in the plant juice is adsorbed to the ground edible material.

With respect to adsorption, and without wishing to be bound to any particular theory, the adsorption of the plant-derived component(s) to the ground edible material (to produce an enriched substance) appears to be based on the ion exchange and electrostatic attraction properties and large surface area of the ground edible material that enable the material to bind to moderately charged and/or moderately polar plant-derived components, while highly charged and/or polar carbohydrates and sugars and poorly charged and/or non-polar fats and oils remain in solution in the plant juice. The ground edible material has a propensity to adsorb plant-derived components of intermediate polarity. Relatively hydrophobic (non-polar), oil-soluble compounds such as carotenoids and polar, highly water-soluble sugars are poorly adsorbed.

In one aspect, the ground edible material is a plant flour. The use of other ground edible materials, such as soybean protein concentrate, soybean protein isolate, protein powder (including, but not limited to, milk powder, whey protein, egg powder, gluten and yeast powder) and cellulose-or chitin-containing material (including, but not limited to, non-soluble vegetable fibers) is also contemplated. In other embodiments, the ground edible material is a bran, produced from the outer layer of plant seeds. Bran includes, but is not limited to, wheat bran, corn bran, rice bran, oat bran and barley bran.

In one embodiment, the plant flour comprises at least 15 weight percent protein. In other embodiments, the flour comprises at least 20, at least 25, at least 30, at least 35, at least 40, at least 45, at least 50, at least 55, at least 60, at least 65, at least 70 or more weight percent protein. In some embodiments, the plant flour is a leguminous flour. Some proteins in legume flour belong to the globulin family of seed storage proteins called leguminins (11S) and vicilins (7S), or, in the case of soybeans, glycinin and beta-conglycinin.

In specific exemplary embodiments, the plant flour is selected from the group consisting of soybean flour, walnut flour, wheat flour, almond flour, aramanth flour, brown rice flour, buckwheat flour, cassava flour, chestnut flour, chickpea flour, chuno flour, corn flour, cornstarch, glutinous rice flour, noodle flour, hazelnut flour, pea flour, bean flour, peanut flour, potato starch flour, rice flour, rye flour, tapioca flour, teff flour, arrowroot flour, taro flour, quinoa flour, mulga flour, ironweed flour, umbrella bush flour, tjuntjula flour, wakalpulka flour, witchetty bush flour, wiry wattle flour, Mitchell grass flour, nardoo flour, old man saltbush flour and wangunu flour.

In some embodiments, the ground edible material is selected from the group consisting of soybean flour, soybean protein concentrate, soybean protein isolate and pea protein isolate. Soybean flour contains trypsin inhibitors, hemagglutinins, and cysteine proteases. The insoluble carbohydrates in soybeans consist of complex polysaccharides, e.g., cellulose, hemicellulose, and pectin. The majority of soybean carbohydrates are considered dietary fiber. Soluble carbohydrates such as disaccharides are present in lower amounts and include sucrose, raffinose, and stachyose.

Three kinds of soybean flour are commercially available: Natural (or full-fat soybean flour), which contains all of the natural oils; low-fat soybean flour, which contains about one third of the natural oils; and defatted soybean flour, which has 99% of the oils removed during processing. Each type is usually heated or roasted at some stage(s) of preparation to improve palatability and flavor. Defatted soy flour is higher in protein content, close to 50 percent, and contains fewer calories per serving than natural soybean flour. The use of natural, low-fat and defatted soybean flour in the methods described herein is specifically contemplated. In addition, the use of other soy products such as soy protein concentrate (low-fat or defatted soybean flour without the soluble carbohydrates) and soy protein isolate (typically 90% soy protein by dry weight) are also contemplated.

In some embodiments, the ground edible material and the plant juice are combined at an exemplary ratio of 5 g to 100 g ground edible material to a plant juice volume of 50 mL to 100 mL. In another embodiment, a ratio from 30 g to 100 g ground edible material to a volume of 50 mL to 100 mL of plant juice is used. In yet another embodiment, a ratio of about 5 g, about 10 g, about 20 g, about 30 g, about 40 g, about 50 g, about 60 g, about 70 g, about 80 g, about 90 g, about 100 g, about 110 g, about 120 g, about 130 g, about 140 g, about 150 g, about 160 g, about 170 g, about 180 g about 190 g, about 200 g or more ground edible material to a volume of 50 mL to 100 mL of plant juice is contemplated. The amount of ground edible material and plant juice for use in the methods described herein can be readily increased to a commercial scale by one of ordinary skill in the art.

In various embodiments, the enriched substance produced by a method described herein is formulated to accommodate specific combinations of plant-derived components in order to produce or elicit specific physiological effects. For example, combinations of bioactive components of Ginkgo biloba and/or Goto kola are used for memory enhancement and can be added to a product described herein or ingested with a product described herein. In some embodiments, the product is useful to promote cardiovascular health, control fat and/or cholesterol, promote healthy joints, maintain or improve bone density, enhance cellular antioxidant capacity, control appetite, improve energy, increase endurance, promote weight loss, promote muscle enhancement, improve digestion, help prevent or treat a symptom of colds, fight infection, or enhance memory. As will be apparent to one skilled in the art, many of the exemplary categories outlined above overlap and are not mutually exclusive. Thus, food products can be designed to contain a product that can bring about more than one desired physiological effect, or to comprise a plurality of products providing overlapping or distinct benefits.

The enriched substances produced by a method described herein are also amenable to combination with other bioactive compounds to produce an enriched product. Thus, an enriched substance can be combined with certain combinations of therapeutic or diagnostic agents, or combinations of nutritional supplements.

The plant-derived component(s) of the enriched substance are at levels sufficient to affect the desired function of the body when taken regularly. Such levels are known in the art or can readily be determined by a skilled technician. It is understood that the total daily intake may be based on administration of one unit of the enriched substance, or it may be based on administration of more than one unit of the enriched substance. The amount of the one or more natural products in the enriched substance will thus vary, depending on the unit size relative to the desired daily dose.

The enriched substance can be formulated in various unit sizes depending on the amount of plant-derived component(s) to be incorporated therein and on requirements of the target consumer. In some embodiments, the enriched substance is formulated to have a unit size between about 2 grams and about 30 grams. In another embodiment, a unit of the enriched substance is between about 3 grams and about 20 grams. In another embodiment, a unit of the enriched substance is between about 3 grams and about 15 grams. In another embodiment, a unit of the enriched substance is between about 3 grams and about 10 grams. Where appropriate, the enriched substance can be provided in a multi-dose format that is pre-scored into unit doses.

One of ordinary skill in the art will appreciate that the amount of plant-derived component(s) contained in the enriched substance will be dependent on the type of plant-derived component(s) and the requirements of the target consumer. For example, the recommended dosage of a plant-derived component(s), such as a vitamin, is generally less, on a weight-to-weight basis, than the recommended dosage of a macro-nutrient, such as calcium, or nutritional supplements such as creatine, protein or fiber, which are known to be required in higher amounts in order to provide a physiological effect.

In some embodiments, it will be beneficial to quantify the amount of plant-derived component(s) contained in the enriched substance. Quantification can be determined by methods well known in the art including, but not limited to, high performance liquid chromatography (HPLC), HPLC-photodiode array detection (PDA), HPLC-mass spectrometry (MS) and the pH differential method.

In one embodiment, the total amount of plant-derived component(s) constitute less than about 25% by weight of the enriched substance. In another embodiment, total amount of plant-derived component(s) constitute between about 0.01% and about 20% by weight of the enriched substance. In another embodiment, the plant-derived component(s) constitute between about 0.01% and about 15% by weight of the enriched substance. In another embodiment, the plant-derived component(s) constitute between about 0.01% and about 10% by weight of the enriched substance.

In an alternative embodiment, the total amount of the plant-derived component(s) constitutes between about 5% and about 50% by weight of the enriched substance. In another embodiment, the total amount of the plant-derived component(s) constitutes between about 7% and about 50% by weight of the enriched substance. In a further embodiment, the total amount of the plant-derived component(s) constitutes between about 10% and about 50% by weight of the enriched substance. In yet another embodiment, the total amount of the plant-derived component(s) constitute at least about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 49%, about 50% by weight or more of the enriched substance.

In some embodiments, the enriched substance (or an enriched product containing the enriched substance) is tested for efficacy in vivo. Typically, when such testing is conducted, efficacy is assessed by bioavailability studies using standard techniques in the pharmaceutical art, such as peak plasma levels and pharmacokinetic analyses (see, for example, Enna, et al., Current Protocols in Pharmacology, J. Wiley & Sons, New York, N.Y.).

Bioavailability studies are usually conducted by administering to groups of subjects various doses of the enriched substance under study over a pre-determined period of time and comparing plasma levels of the plant-derived component(s) in these groups at varying intervals with an appropriate control or controls. In some bioavailability studies, appropriate controls include groups of subjects drinking unprocessed plant juice. The subjects may or may not have fasted prior to administration of the doses of the enriched substance. Single-dose or multiple-dose studies may be conducted. The studies can also be used to monitor any side-effects of the dosing regimens of the enriched substance under investigation by compiling reports of any adverse effects encountered during the course of the study and comparing them to side-effects reported by the control group(s). Optionally, optimal dosing schedules can also be determined in this manner.

Studies to determine whether the combination of plant-derived component(s) in an enriched substance bring about the desired effect in a subject can also be conducted in a manner similar to the bioavailability studies described above. Such studies are routine in the art and can be readily designed and conducted by a skilled technician. End effects measurements are dependent on the type of effect the enriched substance is intended to realize. For example, for weight loss applications, the body weight and/or body fat percentage of individual subjects to whom varying doses of the enriched substance is being administered can be monitored over a period of time and compared to that of individuals in control groups, for example, placebo groups or groups receiving, e.g., unprocessed plant juice alone.

Enriched Food Products

Another aspect of the disclosure is an enriched food product comprising the enriched substance produced by a method described herein. Enriched food products deliver an effective dose of the component(s) obtainable from plant juice in 1, 2, 3, 7, 8 or more servings. Consuming the original plant material to obtain the equivalent amount of component(s) provided in the product may be impossible or impractical because of the large volumes that would have to be consumed, high amounts of associated calories, and undesirable health effects associated with ingesting high-calorie sugars, carbohydrates, and other structural chemicals.

Thus, a method of making an enriched food product comprising a plant-derived component(s) is also provided herein. Such a method comprises, in one aspect, combining plant juice (e.g., a plant extract) with a ground edible material to form an admixture; drying the admixture, thereby producing an enriched substance comprising the plant-derived component and the ground edible material; and incorporating the enriched substance into a food product, thereby making an enriched food product comprising the plant-derived component from the plant material.

The enriched substance can be incorporated into any food product. Exemplary food products include, but are not limited to, baked goods (cakes, cookies, crackers, breads, scones and muffins), dairy-type products (including, but not limited, to cheese, yogurt, custards, rice pudding, mousses, ice cream, frozen yogurt, frozen custard), desserts (including, but not limited to, sherbet, sorbet, water-ices, granitas and frozen fruit purees), spreads/margarines, pasta products and other cereal products, meal replacement products, nutrition bars, trail mix, granola, beverages (including, but not limited to, smoothies, water or dairy beverages and soy-based beverages), and breakfast-type cereal products such as oatmeal. For beverages, the enriched substance may be in solution, suspended, emulsified or present as a solid.

In some embodiments, the enriched food product is a meal replacement product. Nutrition bars and beverages that are intended to constitute a meal replacement are types of meal replacement products. The term also includes products that are eaten as part of a meal replacement weight loss or weight control plan, for example snack products which are not intended to replace a whole meal by themselves, but which may be used with other such products to replace a meal or which are otherwise intended to be used in the plan. These latter products typically have a calorie content in the range of from 50-200 kilocalories per serving.

In some embodiments, the enriched food product is a dietary supplement. In some embodiments, the enriched substance is combined with additional nutritional additives such as vitamins, minerals, herbs or other botanicals, amino acids and substances such as enzymes, organ tissues, glandulars and metabolites.

In yet other embodiments, the enriched food product is a medical food.

In some embodiments, an enriched food product comprising the enriched substance further comprises a bioavailability enhancer, which acts to increase the absorption of the plant-derived component(s) by the body. Bioavailability enhancers can be natural or synthetic compounds.

Natural bioavailability enhancers include ginger, caraway extracts, pepper extracts and chitosan. The active compounds in ginger include 6-gingerol and 6-shogoal. Caraway oil can also be used as a bioavailability enhancer (U.S. Patent Application No. 2003/022838). Piperine is a compound derived from pepper (*Piper nigrum* or *Piper longum*) that acts as a bioavailability enhancer (see U.S. Pat. No. 5,744,161). Piperine is available commercially under the brand name Bioperine® (Sabinsa Corp., Piscataway, N.J.). In some embodiments, the natural bioavailability enhancer is present in an amount of from 0.02% to 0.6% by weight based on the total weight of enriched food product.

Examples of suitable synthetic bioavailability enhancers include, but are not limited to, Gelucire®, Labrafil® and Labrasol®, Lauroglycol®, Pleurol Oleique® (Gattefosse Corp., Paramus, N.J.) and Capmul® (Abitec Corp., Columbus, Ohio).

The properties of the enriched food products disclosed herein ensure that the foods are easy to take and/or to administer. In some embodiments, the enriched food product is formulated for administration to humans and thus contain flavors that would appeal to humans, such as fruit-based flavors. An enriched food product that is formulated with confectionery-like qualities and flavors is also appealing to children who are often resistant to taking medications or supplements due to unpleasant tastes or texture. Thus, in some embodiments, the enriched food product provides a means of easily providing plant-derived components to children.

Enriched Cosmetic Products

Another aspect of the disclosure is an enriched cosmetic product comprising the enriched substance produced by a method described herein. In some embodiments, an enriched cosmetic product containing plant-derived component(s) having antioxidant properties (e.g., anthocyanins and resveratrol) would be useful for cosmetic (or personal care) applications in which the inclusion of antioxidants is desired. For example and without limitation, in such embodiments, the enriched cosmetic product is useful for conditioning, moisturizing and smoothing human skin and preventing or reducing the appearance of lined, wrinkled or aged skin. In some embodiments, an enriched cosmetic product comprising other plant-derived component(s) (including, but not limited to, quercetin, 3-hydroxyflavone, azaleatin, fisetin, galangin, gossypetin, kaempferide, kaempferol, isohamnetin, morin, myricetin, natsudaidain, pachypodol, rhamnazin, rhamnetin, astragalin, azalein, hyperoside, isoquercitin, kaempferitin, myricitrin, quercitrin, robinin, rutin, spiraeoside, xanthorhamnin, amuirensin, icariin, troserutin, fisetinidol, robinetinidol, epicatechin, mesquitol, epigallocatechin, epicatechin gallate, epigallocatechin gallate, butin, eriodictyol, hesperetin, homoeriodictyol, isosakuranetin, naringenin, pinocembrin, sakuranetin, sakuranin, poriol, sterubin, eriocitrin, hesperedin, liquiritin, naringin, narirutin, poncirin, nirurin, sakuranin, aurantinidin, cyanidin, 6-hydroxycyanidin, delphinidin, europinidin, luteolinidin, fisetinidin, guibourtinidin, robinetinidin, pelargonidin, lamvidin, peonidin, petunidin, 5-desoxy-malvidin, capensinidin, diosmetinidin, gesneridin, rosinidin, antirrhinin, chrysanthenin, myrtillin, tulipanin, violdelphin, malvin, oenin, primulin, pulchellidin 3-glucoside, pulchellidin 3-rhamnoside, cyanidin-3-(di-p-coumarylglucoside)-5-glucoside, commelinin, cyanosalvianin, protocyanin, protodelphion, phytoestrogen, caffeine, artemisinin, carotenoids pigments, camphor, menthol, limonene, carvone, nepetalactone, hecogenin, digitoxigenin, chicory sesqueterpene lactones, triptolide, caffeine, ecdysteroids, isothiocyanates, sesquiterpene lactones, barberine, gingerols, ginsenosides, glycycrrhizin, polymethoxylated flavones, tocotrienols, glucosinolates, punicalagins, soluble dietary fiber and organosulfur compounds from onions and garlic, as well as compounds or mixtures of compounds from *Echinacea* extracts, saw palmetto extracts, ginkgo extracts, black cohosh extracts, St. John's wort extracts, milk thistle extracts and vitamins (including vitamin A (retinol), vitamin $B_1$ (thiamine), vitamin C (ascorbic acid), vitamin D (calciferol), vitamin $B_2$ (riboflavin), vitamin E (tocopherol), vitamin $B_{12}$ (cyanocobalamin), vitamin K (phylloquinone), vitamin $B_5$ (pantothenic acid), vitamin $B_7$ (biotin), vitamin $B_6$ (pyridoxine), vitamin $B_3$ (niacin) and vitamin $B_9$ (folic acid)) is also contemplated.

Compositions suitable for personal care products generally are formulated as, e.g., shampoos, conditioners, shower gels, liquid hand cleansers, facial cleansers, moisturizers, lotions, skin lotions and creams (such as eye creams and lip creams), facial skin cosmetics (such as blusher and highlighter), eye cosmetics (such as eye shadow, eye brow color, and eye liner), lip cosmetics (such as lip rouge), foundation, concealer, wrinkle-soothing sera, mascaras, skin facial masks, sunscreens, scalp hair-styling aids, facial hair-styling aids, emulsions, oils, mousses, ointments, milks, pomades, solutions, sprays, aerosols, powders, foams, gels (such as skin gels, eye gels, and lip gels), or other skin or hair products known in the art.

Enriched Pharmaceutical Products

Another aspect of the disclosure is an enriched pharmaceutical product. An enriched pharmaceutical product comprises a therapeutic ingredient that provides a benefit such as a health/wellness-promoting and/or disease-preventing/mitigating/treating property in addition to the enriched substance described herein, and typically one or more pharmaceutically acceptable carriers or excipients (which are discussed below). In some embodiments, the therapeutic ingredient include without limitation drug-like molecules, a protein therapeutic and small molecules. Protein therapeutic agents include, without limitation peptides, enzymes, structural proteins, receptors and other cellular or circulating proteins as well as fragments and derivatives thereof, the aberrant expression of which gives rise to one or more disorders. Therapeutic agents also include, as one specific embodiment, chemotherapeutic agents. Therapeutic agents also include, in various embodiments, a radioactive material.

In some embodiments, the therapeutic ingredient is a small molecule. The term "small molecule," as used herein, refers to a chemical compound, for instance a peptidometic that may optionally be derivatized, or any other low molecular weight organic compound, either natural or synthetic. Such small molecules may be a therapeutically deliverable substance or may be further derivatized to facilitate delivery.

The term "drug-like molecule" is well known to those skilled in the art, and includes the meaning of a compound that has characteristics that make it suitable for use in medicine, for example and without limitation as the active agent in a medicament. Thus, for example and without limitation, a drug-like molecule is a molecule that is synthesized by the techniques of organic chemistry, or by techniques of molecular biology or biochemistry, and is in some embodiments a small molecule as defined herein. A drug-like molecule, in various embodiments, additionally exhibits features of selective interaction with a particular protein or proteins and is bioavailable and/or able to penetrate cellular membranes.

In various embodiments, therapeutic agents described in U.S. Pat. No. 7,667,004 (incorporated by reference herein in its entirety) are contemplated for use in the compositions and methods disclosed herein and include, but are not limited to, alkylating agents, antibiotic agents, antimetabolic agents, hormonal agents, and biologic agents.

Plant-Derived Components

In some embodiments, the plant-derived component is a phenolic compound. Phenolic compounds are characterized by having at least one aromatic ring with one or more hydroxyl groups (Crozier, A, I. B. Jaganathb, M. N. Clifford. 2009. Dietary phenolics: chemistry, bioavailability and effects on health. Nat. Prod. Reports. 26: 1001-1043). Many phenolic compounds can be derivatized (e.g., esterified or glucosylated) and/or form dimers, oligomers or polymers. Basic skeletons of non-derivatized phenolics include, but are not limited to, phenolic acids, acetophenones, phenylacetic acids, hydroxycinnamic acids, coumarins, naphthoquinones, xanthones, stilbenes, and flavonoids. Flavonoids are the most numerous of the phenolics and have numerous health benefits. The main subclasses of dietary flavonoids are flavonols, flavones, flavan-3-ols, anthocyanidins, flavanones and isoflavones, dihydroflavonols, flavan-3,4-diols, coumarins, chalcones, dihydrochalcones and aurones. Polymerization of hydroxylated or esterified flavan-3-ols leads to the formation of proanthocyanidins also known as condensed or non-hydrolyzable tannins. Proanthocyanidins that consist exclusively of (epi)catechin units are called procyanidins, and are the most abundant type of proanthocyanidins in plants. The other class of tannins, hydrolyzable tannins, are derived from gallic acid.

In some embodiments, the phenolic compound is a flavonoid compound. In one embodiment, the phenolic compound is a flavonol. Flavonols are a class of flavonoids that have the 3-hydroxyflavone backbone (IUPAC name: 3-hydroxy-2-phenylchromen-4-one) and are linked to a carbohydrate, i.e., sugar. Exemplary flavonols include, but are not limited to, quercetin, 3-hydroxyflavone, azaleatin, fisetin, galangin, gossypetin, kaempferide, kaempferol, isohamnetin, morn, myricetin, natsudaidain, pachypodol, rhamnazin and rhamnetin. In another embodiment, the flavonoid compound is a flavonol glycoside. Exemplary flavonol glycosides include, but are not limited to, astragalin, azalein, hyperoside, isoquercitin, kaempferitin, myricitrin, quercitrin, robinin, rutin, spiraeoside, xanthorhamnin, amuirensin, icariin and troserutin. Phenolic compounds obtainable from plant material, e.g., plant juice comprising a 3-hydroxyflavone backbone are specifically contemplated.

In some embodiments, the phenolic compound is a flavanol. Flavanols are a class of flavonoids that have the 2-phenyl-3,4-dihydro-2H-chromen-2-ol backbone. Exemplary flavanols include, but are not limited to, flavan-3-ols (e.g., catechins and catechin gallates). In some embodiments, the flavanol is a compound selected from the group consisting of fisetinidol, robinetinidol, epicatechin, mesquitol, epigallocatechin, epicatechin gallate and epigallocatechin gallate. Phenolic compounds obtainable from plant material, e.g., plant juice comprising a 2-phenyl-3,4-dihydro-2H-chromen-2-ol backbone are specifically contemplated.

In some embodiments, the phenolic compound is a flavanone. Exemplary flavanones include, but are not limited to, butin, eriodictyol, hesperetin, homoeriodictyol, isosakuranetin, naringenin, pinocembrin, sakuranetin, sakuranin, poriol, and sterubin. In some embodiments, the flavonoid compound is a glycoside of a flavanone. Exemplary flavanone glycosides include, but are not limited to, eriocitrin, hesperedin, liquiritin, naringin, narirutin, poncirin, nirurin and sakuranin.

In some embodiments, the phenolic compound is an anthocyanidin. Exemplary anthocyanidins include, but are not limited to, aurantinidin, cyanidin, 6-hydroxycyanidin, delphinidin, europinidin, luteolinidin, fisetinidin, guibourtinidin, robinetinidin, pelargonidin, lamvidin, peonidin, petunidin, 5-desoxy-malvidin, capensinidin, diosmetinidin, gesneridin and rosinidin. In some embodiments, the flavonoid compound is an anthocyanin (i.e., a glycoside of an anthocyoanidin). Exemplary anthocyanins include, but are not limited to, antirrhinin (cyanidin 3-O-rutinoside), chrysanthenin (cyanidin 3-glucoside), myrtillin (delphinidin 3-O-glucoside, tulipanin (delphinidin 3-O-rutinoside)), violdelphin (delphinidin 3-rutinoside-7-O-(6-O-(4-(6-O-(4-hydroxybenzoyl)-beta-D-glucosyl)oxybenzoyl)-beta-D-glucoside), malvin (diglucoside of malvidin), oenin (malvidin 3-O-glucoside), primulin (malvidin-3-O-galactoside), pulchellidin 3-glucoside, pulchellidin 3-rhamnoside, cyanidin-3-(di-p-coumarylglucoside)-5-glucoside, commelinin (a tetranuclear (4 $Mg^{2+}$) metal complex, in which two $Mg^{2+}$ions chelate to six anthocyanin molecules, while the other two $Mg^{2+}$ions bind to six flavone molecules), cyanosalvianin (a metalloanthocyanin: 3-O-(6-O-p-coumaroylglucopyranosyl)-5-O-(4-O-acetyl-6-O-malonylglucopyranosyl), delphinidin, 7,4'-di-O-glucopyranosylapigenin and magnesium ion) and protocyanin (supermolecular pigment consisting of a complex of anthocyanin, flavone, one ferric iron, one magnesium and two calcium ions).

In some embodiments, the phenolic compound is an isoflavonoid. Isoflavonoids have the 3-phenylchromen-4-one backbone. In one embodiment, the isoflavonoid is a phytoestrogen. Phenolic compounds obtainable from plant material, e.g., plant juice comprising a 3-phenylchromen-4-one backbone are specifically contemplated.

In some embodiments, the component is an alkaloid. In some embodiments, the alkaloid is caffeine. Caffeine is a naturally occurring xanthine alkaloid found in varying quantities in the seeds (e.g., beans), leaves, and fruit of some plants (e.g., where it acts as a natural pesticide). In humans, caffeine may have numerous beneficial effects. The most common use of caffeine as a supplement is as a central nervous system stimulant and performance enhancer, particularly in terms of mood, mental tasks and alertness (Smith et al., J Psychopharmacol. 19(6):620-6, 2005). Common sources of caffeine are coffee, tea, and, to a lesser extent, cocoa bean. Less commonly used sources of caffeine include the yerba matéand guarana plants, which are sometimes used in the preparation of teas and energy drinks. Two of caffeine's alternative names, mateine and guaranine, are derived from the names of the yerba matéand guarana plants.

One of the world's primary sources of caffeine is the coffee "bean" (which is the seed of the coffee plant), from which coffee is brewed. Caffeine content in coffee varies widely depending on the type of coffee bean and the method of preparation used; even beans within a given bush can show variations in concentration. In general, one serving of coffee ranges from 40 mg for a single shot (30 ml) of arabica-variety espresso, to about 100 mg for a cup (120 ml) of drip coffee. In general, dark-roast coffee has less caffeine than lighter roasts because the roasting process reduces the bean's caffeine content. Arabica coffee normally contains less caffeine than the robusta variety.

Tea is another common source of caffeine. Tea is the agricultural product of the leaves, leaf buds, and internodes of Camellia sinensis (the "Tea plant"). Teas are prepared and cured by various methods. The aromatic beverage is typically prepared from the cured leaves by combination with hot or boiling water. There are at least six varieties of tea, i.e., white, yellow, green, oolong, black and pu-erh, of which the most commonly found on the market are white, green, oolong and black. Different tea varieties may be made from the same plant (i.e., Camellia sinensis), with the leaves being processed differently and, in the case of fine white tea, grown differently. Pu-erh tea, a post-fermented tea, is also often used medicinally.

The term "herbal tea" refers to an infusion or tisane of leaves, flowers, fruit, herbs or other plant material from a plant other than Camellia sinensis. Exemplary plants for herbal tea production are Chrysanthemum, ginger, honeysuckle, dandelion, and jasmine. The term "red tea" refers to an infusion made from either black tea or the South African rooibos plant (containing no Camellia sinensis).

In some embodiments, the component obtainable from plant juice is a terpenoid (or an isoprenoid). Terpenoids are derived from five-carbon isoprene units assembled and modified in many different ways. Classes of plant terpenoids, based on the number of isoprene units, include but are not limited to, hemiterpenoids, monoterpenoids, sesquiterpenoids, diterpenoids, sesterterpenoids, triterpenoids, tetraterpenoids and polyterpenoids. Exemplary terpenoids include artemisinin, carotenoids pigments, camphor, menthol, limonene, carvone, nepetalactone, hecogenin, digitoxigenin, chicory sesqueterpene lactones and triptolide.

In some embodiments, the component obtainable from plant material, e.g., plant juice is selected from the group consisting of antioxidants, carotenoids, caffeine, ecdysteroids, isothiocyanates, sesquiterpene lactones, barberine, gingerols, ginsenosides, glycycrrhizin, polymethoxylated flavones, tocotrienols, glucosinolates, punicalagins, soluble dietary fiber and organosulfur compounds from onions and garlic, as well as compounds or mixtures of compounds from *Echinacea* extracts, saw palmetto extracts, ginkgo extracts, black cohosh extracts, St. John's wort extracts, milk thistle extracts and vitamins (including vitamin A (retinol), vitamin $B_1$ (thiamine), vitamin C (ascorbic acid), vitamin D (calciferol), vitamin $B_2$ (riboflavin), vitamin E (tocopherol), vitamin $B_{12}$ (cyanocobalamin), vitamin K (phylloquinone), vitamin $B_5$ (pantothenic acid), vitamin $B_7$ (biotin), vitamin $B_6$ (pyridoxine), vitamin $B_3$ (niacin) and vitamin $B_9$ (folic acid)).

In some embodiments, the component obtainable from plant material, e.g., plant juice is selected from the group consisting of proteins, stiviol glucosides, proanthocyanidins, flavan-3-ols (vatechins and catechin gallates), hydrolyzable tannins (gallotannins and ellagitannins), phlorotannins, gingerols, sesquiterpene lactones, sulforaphane, isothiocyanates, anthocyanins, resveratrol, quercetin and caffeine. Anthocyanins are present in all tissues of higher plants, including leaves, stems, roots, flowers and fruits. Plants known in the art to be rich in anthocyanins are *Vaccinium* species, such as acai (320 mg/100 g), blueberry (558 mg/100 g), chokeberry (1480 mg/100 g), cranberry and bilberry, Rubus berries including black raspberry (589 mg/100 g), red raspberry (365 mg/100 g), blackberry (317 mg/100 g), blackcurrant (190-270 mg/100 g), redcurrant (80-420 mg/100 g), cherry (350-400 mg/100 g), eggplant (750 mg/100 g), black rice, Concord grape (888 mg/100 g) and muscadine grape, purple corn (1642 mg/100 g), red cabbage, black soybean (2,000 mg/100 g) and violet petals. Plant material, such as plant juice obtainable from plants rich in anthocyanins is specifically contemplated.

Resveratrol is found in the skin of red grapes and is a constituent of red wine. Plant material, e.g., plant juice obtainable from plants rich in resveratrol is specifically contemplated.

Foods known in the art to be rich in quercetin include capers, lovage, apples, tea plant (*Camellia sinensis*), onion (especially red onion), red grapes, citrus fruit, tomato, broccoli and other leafy green vegetables, and a number of berries including cherry, raspberry, bog whortleberry, lingonberry, cranberry, chokeberry, sweet rowan, rowanberry, sea buckthorn berry, crowberry, and the fruit of the prickly pear cactus. Plant material, e.g., plant juice obtainable from plants rich in quercetin is specifically contemplated.

Catechins are polyphenolic antioxidant plant metabolites. Catechins are abundant in teas derived from the tea plant *Camelia sinensis* (including white tea, green tea, black tea and Oolong tea) as well as in some cocoas and chocolates (made from the seeds of *Theobroma cacao*). Plant material, e.g., plant juice obtainable from plants rich in catechins is specifically contemplated.

In some embodiments, the products from a plant material, e.g., plant juice, are proteins. Exemplary proteins include, but are not limited to, protease inhibitors (e.g., potato protease inhibitor I and potato protease inhibitor II) and proteases (e.g., papain and bromelain).

Plant Material

Plant material useful in the methods described herein is a blueberry, blackberry, raspberry, hockenberry, gooseberry, boysenberry, acai berry, baneberry, barberry, bearberry, bilberry, chokeberry, bunchberry, buffalo berry, chokecherry, cowberry, elderberry, cranberry, dew berry, currant, farkleberry, goji berry, gooseberry, grape, holly berry, huckleberry, ivy berry, june berry, juniper berry, lingonberry, logan berry, mistletoe berry, nannyberry, Oregon grape, persimmon, pokeberry, privet berry, salmonberry, strawberry, sugarberry, tayberry, thimbleberry, white mulberry, red mulberry, black mulberry, wineberry, wintergreen, yew berry, maqui berry, acerola, white currant, cinnamon, guava, kiwi, pomegranate, passion fruit, melon or young berry. In some embodiments, the plant juice is from a fruit-producing plant selected from the group consisting of plums, apricots, peaches, apples, oranges, lemons, limes, tangerines, grapefruit, bananas, pears, cherries, grapes, tomatoes, strawberries, cranberries, figs, pineapple, watermelon, pumpkin, cantaloupe, mango, papaya, peanuts, walnuts, pecans, almonds, cashew nuts, prunes, raisins, pineapple, cucumbers, coffee, noni and eggplant. In some embodiments, the plant material is obtainable from a vegetable plant selected from the group consisting of potatoes, onions, green onions, shallots, garlic, carrots, turnips, beets, parsnips, radishes, rutabaga, celery, mushrooms, corn, okra, spinach, cabbage, kale, lettuce, broccoli, cauliflower, string beans, soybeans, peas, cucumbers, squash, zucchini, lettuce, broccoli rabe, broccoli romanesco, rhubarb, collard greens, brussels sprout, bok choy, arugula and daikon. In some embodiments, the plant material is obtainable from a medicinal plant selected from the group consisting of St. John's wort, *Echinacea*, saw palmetto, ginkgo, ginseng, black cohosh, and dairy (e.g., milk) thistle. In some embodiments, the plant material is obtainable from a fungus including, but not limited to, mushrooms, such as almond mushrooms, lingzhi mushrooms, caterpillar fungus, shiitake mushrooms, button mushrooms, Portobello mushrooms, straw mushrooms, oyster mushrooms, enokitake, milk mushrooms, morels, chanterelles, truffles, black trumpets and porcini mushrooms. In some embodiments, the plant material is obtainable from algae, such as blue green algae (e.g., *Spirulina*), green algae and red algae.

The plant material is, in some embodiments, pomace obtained from any plant disclosed herein.

In rare circumstances, a plant material as a whole may be harmful to at least one mammal and may, therefore, not be useful as a plant material as defined herein. Such potentially non-useful plant materials may contain an edible material, however, and if so, the potentially non-useful plant material is contemplated as suitable for the methods described herein.

In some embodiments, the plant material is an extract that is produced by a method comprising contacting the plant material with an extractant fluid, reducing the pH of the solution to less than pH 4, incubating the plant material in the extractant fluid for a time sufficient to extract a plant-derived component, and collecting the fluid to obtain an extract comprising the plant-derived component. As noted in the Examples provided herein, such extracts will have higher concentrations of the plant-derived component than would have been obtained using a neutral or alkaline pH. In some embodiments, the method comprises processing the plant material prior to the extracting step. For example, in some embodiments, the method comprises grinding, milling, pureeing or pulverizing the plant material prior to the extracting step. The plant material, in some embodiments is pomace (e.g., cranberry pomace, grape pomace, maqui pomace and blueberry pomace, or pomace of any plant described herein).

In some embodiments, the plant material and the extractant fluid are combined at an exemplary ratio of 5 g to 100 g plant material to a volume of 50 mL to 1 L extractant fluid. In some embodiments, a ratio from 30 g to 100 g plant material to a volume of 100 mL to 2 L extractant fluid is used. In some embodiments, a ratio of about 5 g, about 10 g, about 20 g, about 30 g, about 40 g, about 50 g, about 60 g, about 70 g, about 80 g, about 90 g, about 100 g, about 110 g, about 120 g, about 130 g, about 140 g, about 150 g, about 160 g, about 170 g, about 180 g, about 190 g, about 200 g or more plant material to a volume of about 50 mL, about 100 mL, about 200 mL, about 300 mL, about 400 mL, about 500 mL about 600 mL, about 700 mL, about 800 mL, about 900 mL, about 1 L or about 2 L extractant fluid is contemplated. The amount of plant material and extractant fluid for use in the methods described herein can be readily increased to a commercial scale by one of ordinary skill in the art.

The extractant fluid for use in an extraction method described herein is typically a liquid. Suitable extractant fluids include, but are not limited to, water, alcohols, aqueous solutions, halocarbons, esters and supercritical fluids. Suitable alcohols include primary alcohols such as ethanol, N-propanol, N-butanol, N-pentanol, N-hexanol, N-octanol, N-nonanol and N-decanol as well as secondary alcohols such as isopropanol, isobutanol, and the secondary alcohol derivatives of, e.g., any of butane through decane. For those lower molecular weight compounds that are gases at room temperature and about one atmosphere (Atm), pressurized extractions in which the compounds are in a liquid state are contemplated. In some embodiments, the extractant fluid is ethanol (e.g., about 10% ethanol, or about 20% ethanol, or about 30% ethanol, or about 50% ethanol). In some embodiments, the extractant fluid is 50% ethanol. A benefit of incorporating an ethanolic fluid during the extraction process is that an ethanolic fluid is compatible with an ingestible product, and therefore is suitable for use in preparing an extract for incorporation into a pill, a capsule, a tablet, and other ingestible forms known in the art.

In some embodiments, the fluid mixture comprising the extractant fluid and the plant material is incubated with or without agitation for about 30 minutes (or about 1 hour, about 2 hours, about 3 hours, about 4 hours, about 5 hours, about 6 hours, about 7 hours, about 8 hours, about 9 hours, about 10 hours or longer) at a temperature of about 20° C. (or about 25° C., about 30° C., about 35° C., about 40° C., about 45° C., about 55° C., about 60° C., about 65° C., about 70° C., about 80° C., about 85° C. or more).

The extract produced by a method described herein is optionally further processed by removing solid matter from the extract. Solid matter is removed from the extract by any method known in the art including, but not limited to, filtration and centrifugation.

In some embodiments, the amount of a plant-derived component obtained during an extraction process at a reduced pH (i.e., a pH less than pH4) as described herein, is at least about 10% (w/w) higher than the amount of the plant-derived component obtained during an extraction process at a more basic pH (i.e., pH≥5), for equivalent masses of starting plant material. In some embodiments, the amount of a plant-derived component obtained during an extraction process at a pH less than pH4 as described herein and prior to any optional further processing is, by weight/weight, at least about 10%, about 15%, about 20%, about 25%, about 30%, about 35%, about 40%, about 45%, about 50%, about 55%, about 60%, about 65%, about 70%, about 75%, about 80%, about 85%, about 90%, about 91%, about 92%, about 93%, about 94%, about 95%, about 96%, about 97%, about 98%, about 99%, or at least about 2-fold, about 3-fold, about 4-fold, about 5-fold, or about 10-fold more than the concentration of the plant-derived component obtained during an extraction process at a higher pH (i.e., pH≥5) prior to any optional further processing.

In some embodiments, the concentration (e.g., percentage (w/v)) of a plant-derived component obtained during an extraction process at a pH less than pH 4 as described herein and prior to any optional further processing is, by weight/volume, at least about 10%, about 15%, about 20%, about 25%, about 30%, about 35%, about 40%, about 45%, about 50%, about 55%, about 60%, about 65%, about 70%, about 75%, about 80%, about 85%, about 90%, about 91%, about 92%, about 93%, about 94%, about 95%, about 96%, about 97%, about 98%, about 99%, or at least about 2-fold, about 3-fold, about 4-fold, about 5-fold, or about 10-fold more than the concentration of the plant-derived component obtained during an extraction process at a higher pH (i.e., pH≥5) prior to any optional further processing.

In some embodiments, the pH is reduced before the plant material is combined with the extractant fluid. In some embodiments, the pH is reduced after the plant material is combined with the extractant fluid. Thus, in one non-limiting example, a composition comprising the plant material is reduced to about pH≤4 prior to combining the composition with an extractant fluid. Alternatively, in some embodiments, the extractant fluid is reduced to about pH≤4 prior to combining the extractant fluid with the plant material. In aspects wherein the pH is reduced before the combining step, it is further contemplated that, in some embodiments, a further reduction in pH is required to achieve a desired final pH.

It is contemplated that the pH is reduced by any method known to those of skill in the art. For example, in various embodiments, the pH is reduced by addition of an acid selected from the group consisting of acetic acid, adipic acid, citric acid, fumaric acid, glucono-delta-lactone, hydrochloric acid, lactic acid, malic acid, phosphoric acid, succinic acid and tartaric acid. In some embodiments, the pH is reduced by adding to the composition a substance selected from the group consisting of lactic acid bacteria, yeast and a combination thereof.

Regardless of the method used to reduce the pH of the composition, the present disclosure contemplates that, in some embodiments, the pH is reduced to about 4.0. In some embodiments, the pH is reduced to about 2.0. In some embodiments, the pH is reduced to about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, or about 4.9. In some embodiments, the pH of the composition is reduced to between pH 2.0 to 5.0, or between 2.5 to 4.5, or between 3 to 4.5, or between 3.5 to 4.5, or between 3.5 to 4.0.

Reduction in pH is also described as a reduction relative to a starting pH. In one non-limiting example, the starting pH of a composition comprising a plant-derived component ranges from about pH 3 to about pH 6. In embodiments wherein the desired final pH is 2.0, the pH is thus reduced by 4.0 pH units. Accordingly, also contemplated herein are methods in which the pH is reduced by about 12, about 11.5, about 11, about 10.5, about 10, about 9.5, about 9, about 8.5, about 8, about 7.5, about 7, about 6.5, about 6, about 5.5, about 5, about 4.5, about 4, about 3.5, about 3, about 2.5, about 2, about 1.5, about 1, or about 0.5 pH units.

Routes of Administration and Dosage

The disclosure contemplates compositions comprising a product (or the product alone) or one or more component(s)

thereof that are, in some embodiments, tabletted, encapsulated or otherwise formulated for oral administration. The compositions may be provided as pharmaceutical compositions, nutraceutical compositions (e.g., a dietary supplement), or as a food or beverage additive, as defined by the U.S. Food and Drug Administration. The dosage form for the above compositions are not particularly restricted. For example, liquid solutions, suspensions, emulsions, tablets, pills, capsules, sustained release formulations, powders, liposomes, microparticles, microcapsules, are all contemplated as suitable dosage forms.

In various embodiments, the compositions include one or more suitable diluents, fillers, salts, disintegrants, binders, lubricants, glidants, wetting agents, controlled release matrices, colorings, flavorings, carriers, buffers, stabilizers, solubilizers, commercial adjuvants, and/or other additives known in the art.

Any pharmaceutically acceptable (i.e., sterile and acceptably non-toxic as known in the art) liquid, semisolid, or solid diluent that serves as a pharmaceutical vehicle, excipient, or medium can be used. Exemplary diluents include, but are not limited to, polyoxyethylene sorbitan monolaurate, magnesium stearate, calcium phosphate, mineral oil, cocoa butter, and oil of theobroma, methyl-and propylhydroxybenzoate, talc, alginates, carbohydrates, especially mannitol, α-lactose, anhydrous lactose, cellulose, sucrose, dextrose, sorbitol, modified dextrans, gum acacia, and starch. Such compositions may influence the physical state, stability, rate of in vivo release, and rate of in vivo clearance of the functional compounds Pharmaceutically acceptable fillers include, for example and without limitation, lactose, microcrystalline cellulose, dicalcium phosphate, tricalcium phosphate, calcium sulfate, dextrose, mannitol, and/or sucrose. Salts, including calcium triphosphate, magnesium carbonate, and sodium chloride, are used in various embodiments as fillers in the pharmaceutical compositions.

In some embodiments, binders are used to hold the composition containing the enriched substance together to form a hard tablet. Exemplary binders include materials from organic products such as acacia, tragacanth, starch and gelatin. Other suitable binders include, without limitation, methyl cellulose (MC), ethyl cellulose (EC) and carboxymethyl cellulose (CMC).

The amount and administration regimen of the product or one or more component(s) thereof is based on various factors relevant to the purpose of administration, for example human or animal age, sex, body weight, hormone levels, or other nutritional need of the human or animal. In some embodiments, the product is administered to an animal in an amount from 0.001 mg/kg body weight to 10 g/kg body weight. In some embodiments, the product or one or more component(s) thereof is administered to an animal in an amount of about 0.005 mg/kg, about 0.01 mg/kg, about 0.05 mg/kg, about 0.1 mg/kg, about 1 mg/kg, about 10 mg/kg, about 100 mg/kg, about 250 mg/kg, about 500 mg/kg, about 1 g/kg, about 2.5 g/kg, about 5 g/kg, about 7.5 g/kg, or about 10 g/kg body weight.

A typical regimen may comprise multiple doses of a product or one or more component(s) thereof. In one embodiment, the product or one or more component(s) thereof is administered once per day. The product or one or more component(s) thereof may be administered to an individual at any time.

It will be appreciated that the product or one or more component(s) thereof is useful in the fields of human medicine and veterinary medicine to provide concentrated component(s) obtainable from a plant material to a subject in need thereof. Thus, the subject or individual to be treated may be a mammal, such as a human. For veterinary purposes, subjects include, for example, farm animals such as cows, sheep, pigs, horses, and goats; companion animals such as dogs and cats; exotic and/or zoo animals; laboratory animals including mice, rats, rabbits, guinea pigs, and hamsters; and poultry such as chickens, turkeys, ducks, and geese.

In some embodiments, the product or one or more component(s) thereof is formulated for administration to a non-human animal. Administration of component(s) obtainable from plant material to an animal in conventional solid dosage forms, such as tablets and capsules, can be problematic in that the animal often expels them, and multiple dosing is often difficult because the animal learns to resist the dosing procedure. The enriched substance, formulated as an enriched product, is ideally suited for administration of plant-derived component(s) to animals. When formulated for this purpose, the enriched product comprising the enriched substance may contain flavors that more typically appeal to non-human animals, for example, fish or meat flavors.

EXAMPLES

Example 1

Dependence of Grape Pomace Extraction Yield on Solvent, Time and Agitation Conditions The following Example discloses an experiment that evaluated the effect of type of solvent, length of time and agitation conditions in producing grape pomace extracts.

Grape pomace was depectinized by methods known in the art. The depectinized grape pomace (20 g wet weight; Milne) was pureed in a Vitamix blender with 200 mL water or 200 mL of 20% ethanol, then each sample was incubated at 85° C. with or without agitation (i.e., centrifugation at 105 rpm in a rotary evaporation flask without vacuum). An aliquot of each sample was removed after 0, 1, 2 and 3 hours of extraction, allowed to cool to room temperature and then centrifuged at 13,000 rpm for 3 minutes to separate the solids from the extract. The concentration of total polyphenols (mg/L) was quantified using the Folin-Ciocalteu method (Singleton and Rossi, 1965) and is summarized in Tables 1A and 1B below. About 80% of the liquid extract (160 mL) was recovered from each 10:1 extraction.

To obtain the dry weight of the grape pomace, 20.5 g of the material was freeze-dried and the dry weight obtained was 7.3 g. Therefore, the wet pomace contained 64% water.

Based on these data, the 20 g of the grape pomace starting material corresponds to 7.2 g of dry weight pomace. Polyphenols as a percentage of pomace dry weight was calculated for each extraction. For example, 126 mg/L×0.16 L=20.16 mg of total polyphenols (TP) extracted. Percent polyphenols=20.16 mg /7200 mg dry wt.×100=0.28%

TABLE 1A

Total polyphenols extracted from grape pomace using different solvents and extraction times in the presence of agitation.

| | With agitation | | | | | |
|---|---|---|---|---|---|---|
| | H₂O | | | 20% EtOH | | |
| | TP (mg/L) | Mass (mg) TP in Extract | % TP | TP (mg/L) | Mass (mg) TP in Extract | % TP |
| 0 | 126 | 20.16 | 0.28 | 232 | 37.12 | 0.52 |
| 1 | 324 | 51.84 | 0.72 | 765 | 122.4 | 1.7 |
| 2 | 396 | 63.36 | 0.88 | 845 | 135.2 | 1.9 |
| 3 | 425 | 68 | 0.94 | 841 | 134.56 | 1.9 |

TABLE 1B

Total polyphenols extracted from grape pomace using different solvents and extraction times in the absence of agitation.

| | With agitation | | | | | |
|---|---|---|---|---|---|---|
| | H₂O | | | 20% EtOH | | |
| | TP (mg/L) | Mass (mg) TP in Extract | % TP | TP (mg/L) | Mass (mg) TP in Extract | % TP |
| 0 | 125 | 20 | 0.28 | 177 | 28.32 | 0.39 |
| 1 | 252 | 40.32 | 0.56 | 538 | 86.08 | 1.2 |
| 2 | 356 | 56.96 | 0.79 | 588 | 94.08 | 1.3 |
| 3 | 376 | 60.16 | 0.84 | 633 | 101.28 | 1.4 |

The data in this Example demonstrate that the concentration of polyphenols obtainable from grape pomace extractions is dependent upon the type of extractant fluid utilized and the amount of time for which the extractant fluid and pomace are incubated.

Example 2

Increasing the Incubation Time of Grape Pomace with an Extractant Fluid Increased the Efficiency of Grape Pomace Extraction The following Example was performed to determine whether varying incubation times of grape pomace in an extractant fluid increases the efficiency of the extraction.

Depectinized grape pomace (20 g) was pureed in a Vitamix blender with 200 mL of 50% ethanol and then incubated at 85° C. with agitation (i.e., centrifugation at 105 rpm in a rotary evaporation flask without vacuum). An aliquot of the sample was removed after 0, 1, 2 and 3 hours of extraction, allowed to cool to room temperature and then centrifuged at 13,000 rpm for 3 minutes to separate the solids from the extract. The concentration of total polyphenols (mg/L) was quantified using the Folin-Ciocalteu method (Singleton and Rossi, 1965) and is summarized in Table 2 below. The highest yield of polyphenols was obtained by extracting with 50% ethanol at 85° C. with agitation for 3 hours. About 80% of the liquid extract (160 mL) was recovered from each 10:1 extraction.

A sample (20 g) of grape pomace was dried according to the method described in Example 1. The dry weight of 20 g of wet grape pomace is 7.2 g. The percent of polyphenols based on pomace dry weight was calculated for each extraction. For example, 458 mg/L×0.16 L=73.3 mg of total polyphenols (TP) extracted. Percent total polyphenol=73.3 mg/7200 mg dry wt.×100=1.0%.

TABLE 2

Total polyphenols extracted from grape pomace with 50% ethanol

| Time (h) | Total Polyphenols (mg/L) | % TP | Volume (L) of Extract | Mass (mg) of TP in Extract |
|---|---|---|---|---|
| 0 | 458 | 1.0 | 0.16 | 73.3 |
| 1 | 1087 | 2.4 | 0.16 | 173.92 |
| 2 | 1284 | 2.9 | 0.16 | 205.44 |
| 3 | 1358 | 3.0 | 0.16 | 217.28 |

These data demonstrate that the highest concentration of polyphenols (1358 mg/L of extract) and mass of TP in the extract (217.28 mg) were obtained from extraction of grape pomace in 50% ethanol with an incubation time of 3 hours.

Example 3

Extraction of Grape and Cranberry Pomace in 50% Ethanol

The following experiment describes an exemplary method for extracting plant-derived polyphenols from grape and cranberry pomace.

Depectinized grape pomace (200 g) or depectinized cranberry pomace (200 g) was pureed in a Vitamix blender with 2L of 50% ethanol and then incubated at 85° C. with agitation (i.e., centrifugation at 105 rpm in a rotary evaporation flask without vacuum) for 2 hours. The slurry was centrifuged at 400 rpm for 10 minutes to separate the extract from the solids. An aliquot of extract was centrifuged at 13,000 rpm for 3 minutes to clarify the extract prior to total polyphenol (TP) quantification using the Folin-Ciocalteu method (Singleton and Rossi, 1965). The concentration of total polyphenols in the grape pomace extract was 1197 mg/L and the concentration of total polyphenols in the cranberry pomace extract was 939 mg/L. The 1.5 L of extract collected was freeze-dried and the dried extract was weighed.

The dry weight of the cranberry pomace was determined by freeze-drying 50 g of wet pomace. The cranberry pomace dry weight was 13.62 g, revealing the water content of the cranberry pomace to be 72.8% (((50 g-13.62 g)/50 g)×100). Therefore, the dry weight of 200 g of wet cranberry pomace was calculated to be 54.4 g (200 g×((100−72.8)/100)).

Grape pomace is 64% water and, therefore, the dry weight of 200 g of wet grape pomace is 72 g.

The percentage of total polyphenols from the dried extract, the wet pomace and the dry pomace were calculated for both grape and cranberry pomace extracts and are summarized in Table 6 below.

TABLE 3

Total polyphenols extracted from cranberry pomace and grape pomace with 50% ethanol

|  | TP (mg/L) | volume of extract (L) | Dry extract (g) | Mass (mg) Total TP in Extract | % TP in dry extract residue | % TP in wet pomace wt | % TP in dry pomace wt |
|---|---|---|---|---|---|---|---|
| Grape pomace | 1197 | 1.5 | 4.96 | 1,795.5 | 36.2 | 0.9 | 2.5 |
| Cranberry pomace | 939 | 1.5 | 3.7 | 1,408.5 | 38.0 | 0.7 | 2.6 |

The foregoing experiment demonstrates that the use of 50% ethanol as an extractant fluid was able to extract 36.2% of total polyphenols from grape pomace extract and 38% of total polyphenols from cranberry pomace as a percentage of the dry weight of the relevant pomace extract. Further, the data show that 1.80 g total polyphenols ((1197 mg/L×1.5 L)/1000) was obtained from 200 g wet grape pomace and 1.41 g total polyphenols was extracted from 200 g wet cranberry pomace. The absolute levels of total polyphenols in plant pomaces, and the percentage of total polyphenols in 50% ethanol extractions, indicate that the 50% ethanol improves extraction over water or lower percentage alcohol extractant fluids.

Example 4

Extraction Efficiency for Grape Pomace is Dependent on pH

The following experiment was performed to determine whether the amount of total polyphenols, proanthocyanidins and anthocyanins obtainable from grape pomace extracts (with water as the extractant fluid) is pH-dependent.

Depectinized grape pomace (30 g) was pureed in a Vitamix blender with 300 mL of water (10:1 extraction). The puree was aliquoted into 40 mL volumes and the pH was adjusted from 4 to 2, 3, 5, or 7 with HCl or NaOH. The material was then extracted with water by incubation in an 80° C. water bath for 2 hours. The samples were centrifuged at 4,000 rpm for 10 minutes to separate the solids from the extract. The concentrations of total polyphenols, proanthocyanidins (PACs) and anthocyanins (ACNs) were quantified using the Folin-Ciocalteu method (Singleton and Rossi, 1965), the DMAC method (Prior et al., 2010) and the pH differential method (Lee et al., 2005), respectively. The results are provided in Table 4 below. The highest concentrations of polyphenols, PACs and ACNs were obtained by extracting at pH 2.

TABLE 4

Polyphenols extracted from aqueous slurry of grape pomace adjusted to different pH.

| pH | TP (mg/L) | Extract volume (L) | Mass (mg) TP in extract | PACS (mg/L) | ACNs (mg/L) |
|---|---|---|---|---|---|
| 2 | 380 | 0.3 | 114 | 343 | 9 |
| 3 | 339 | 0.3 | 101.7 | 337 | 5 |
| 4 (unadjusted) | 286 | 0.3 | 85.8 | 272 | 2 |
| 5 | 273 | 0.3 | 81.9 | 275 | 6 |
| 7 | 294 | 0.3 | 88.2 | 262 | 4 |

The foregoing Example demonstrates that the amount of total polyphenols, proanthocyanidins and anthocyanins present in grape pomace extracts is pH-dependent. In particular, the data provided in this Example establish that the highest amount (i.e.,114 mg total polyphenols in the extract) of these compounds was observed in extracts where the pH of a composition comprising plant material (e.g., pureed grape pomace) and the extractant fluid (water) was reduced to a pH of about pH2.

Example 5

Extraction of Grape Pomace in 50% Ethanol at pH 2 Enhances Extraction of Polyphenols The following experiment was performed to determine whether the amount of total polyphenols, proanthocyanidins and anthocyanins obtainable from grape pomace extracts (with 50% ethanol as the extractant fluid) is pH-dependent.

Depectinized grape pomace (30 g) was pureed in a Vitamix blender with 300 mL of 50% ethanol (10:1 extraction). The puree was aliquoted into 40 mL volumes and the pH was adjusted from 4 to 2, 3, 5, or 7 with HCl or NaOH. The material was then extracted in an 80° C. water bath for 2 hours. The samples were centrifuged at 4,000 rpm for 10 minutes to separate the solids from the extract. The concentrations of total polyphenols, proanthocyanidins (PACs) and anthocyanins (ACNs) were quantified using the Folin-Ciocalteu method (Singleton and Rossi, 1965), the DMAC method (Prior et al., 2010) and the pH differential method (Lee et al., 2005), respectively. The highest concentrations of polyphenols, PACs and ACNs were obtained by extracting at pH 2. Results are summarized in Table 5.

TABLE 5 pH dependence of polyphenols extracted from grape pomace in 50% ethanol

| pH | Total Polyphenols (mg/L) | Extract Volume (L) | Mass (mg) TP in Extract | PACS (mg/L) | ACNs (mg/L) |
|---|---|---|---|---|---|
| 2 | 2675 | 0.3 | 802.5 | 1449 | 31 |
| 3 | 1802 | 0.3 | 540.6 | 1058 | 26 |
| 4 (unadjusted) | 1019 | 0.3 | 305.7 | 874 | 27 |
| 5 | 898 | 0.3 | 269.4 | 631 | 24 |
| 7 | 892 | 0.3 | 267.6 | 624 | 21 |

The foregoing Example further demonstrates that the amount of total polyphenols, proanthocyanidins and anthocyanins present in grape pomace extracts is pH-dependent. In particular, the data provided in this Example show that the highest amount of these compounds (i.e., 802.5 mg total polyphenol) was observed in extracts where the pH of a composition comprising plant material (e.g., pureed grape pomace) and the extractant fluid (e.g., 50%ethanol) was reduced to a pH of about 2. In addition, this Example demonstrates that 50% ethanol as an extractant fluid produces a plant extract comprising a more than 7-fold increase in the amount of total polyphenols compared to the plant extract produced with water as the extractant fluid described in Example 4.

Example 6

Ground Edible Material Sorbs a High Concentration of Polyphenols Extracted from Grape Pomace in 50% Ethanol at pH 2

The following experiment demonstrates that an enriched substance comprising a ground edible material and a plant-derived component from grape pomace can be produced using the disclosed methods.

Second, the difference between the total mass calculated above (30 g) and the amount of soy protein isolate (SPI) required to reach the total mass was determined by subtracting the mass of the dried extract from the total mass (i.e., 30 g total mass−15.8 g dried extract). The amount of soy protein isolated required was determined to be 14.2 g.

The 14.2 g of SPI was added to the 720 mL of grape pomace extract and the solvent (50% Ethanol) was removed by rotary evaporation. The remaining slurry was freeze-dried to yield a flowable powder composed of grape polyphenols complexed or sorbed to SPI.

TABLE 6

Total polyphenols and anthocyanins in grape pomace.

| ACNs (mg/L) | TP (mg/L) | Dry extract (g) | Total TP (g) in Extract | % ACNs in dry extract | % ACNs in wet pomace | % ACNs in dry pomace | % TP in dry extract | % TP in dry pomace | % TP in wet pomace |
|---|---|---|---|---|---|---|---|---|---|
| 98 | 2085 | 15.8 | 1.5 | 0.45 | 0.04 | 0.08 | 9.5 | 1.8 | 0.75 |

Depectinized grape pomace (100 g; Milne) was pureed in a Vitamix blender with 1 L of 50% ethanol (10:1 extraction). The puree was adjusted from pH 4 to pH 2 with HCl and the pomace was then extracted with rotation in an 80° C. water bath for 2 hours. The extract was filtered through mira cloth and 720 mL of extract was recovered. The concentrations of total polyphenols (TP) and anthocyanins (ACNs) were quantified using the Folin-Ciocalteu method (Singleton and Rossi, 1965) and the pH differential method (Lee et al., 2005), respectively. Results are summarized below in Table 6.

The extract dry weight per mL was determined for the pomace extract. Three samples of 1 mL were dried in a speed vacuum and the average dry weight was determined to be 22±0.2 mg/mL. The dry weight of the grape pomace was determined by freeze-drying 20 g of wet pomace in a vacuum oven set at 60° C. The water content was 57.7%. Therefore, the dry weight of 100 g of wet pomace was determined to be about 42.3 g. The percentage of total polyphenols and anthocyanins in the dried extract, the wet pomace and the dry pomace were calculated and are summarized in Table 6.

Soy protein isolate (SPI) (14.2 g, see quantity determination below) was added to the liquid grape extract and co-dried. 720 mL of the 10:1 (see above) grape pomace extract yielded 15.8 g of dried extract containing 1.5 g of total polyphenols. To make a SPI/5% total polyphenols from grape pomace, the amount of SPI to be added to the grape pomace extract was calculated as follows:

First, the total mass necessary to produce an enriched substance comprising 10% total polyphenols was calculated.

$$\frac{TP \text{ in extract (g)}}{\text{Total Mass (g)}} = \frac{5\%}{100\%}$$

$$\frac{1.5 \text{ g } TP \text{ in extract}}{X \text{ Total Mass (g)}} = \frac{5\%}{100\%}$$

$$X = 30 \text{ g Total Mass}$$

This Example demonstrates that the amount of total polyphenols and anthocyanins present in grape pomace extracts is pH-dependent. In particular, the data provided in this Example establish that the highest amount of these compounds was observed when the pH of a composition comprising plant material (e.g., pureed grape pomace) and the extractant fluid (50% ethanol) was reduced to a pH of about 2. In addition, the data presented demonstrate that ground edible material comprising 5% total polyphenols can be produced by combining ground edible material, in this instance soy protein isolate, with a plant material extracted in 50% ethanol at a reduced pH.

Example 7

Extraction of Cranberry Pomace in 50% Ethanol Enhanced Extraction of Polyphenols The following experiment describes exemplary methods for extracting plant-derived polyphenols from cranberry pomace in either water or 50% ethanol.

Depectinized cranberry pomace (30 g) was pureed in a Vitamix blender with 300 mL of water or 50% ethanol (10:1 extraction). Each puree was aliquoted into 40 mL volumes in 50 mL tubes and the pH was adjusted from 4 to 2, 3 or 5 with HCl or NaOH. The material was then extracted in an 80° C. water bath for 2 hours. The samples were centrifuged at 4,000 rpm for 10 minutes to separate the solids from the extract; extract recovery was 30 mL per sample. The concentration of total polyphenols (TPs), proanthocyanidins (PACs) and anthocyanins (ACNs) was quantified using the Folin-Ciocalteu method (Singleton and Rossi, 1965), the DMAC method (Prior et al., 2010), and the pH differential method (Lee et al., 2005), respectively. The highest concentrations of polyphenols, PACs and ACNs were obtained by extracting in 50% ethanol at pH 2. Results are summarized in Tables 7A and 7B.

TABLE 7A pH dependence of polyphenols extracted from cranberry pomace in water

| pH | Total Polyphenols (mg/L) | Mass (mg) of TP in Extract | Extract Volume (L) | PACS (mg/L) |
|---|---|---|---|---|
| 2 | 266 | 79.8 | 0.3 | 114 |
| 3 | 104 | 31.2 | 0.3 | 47 |
| 4 (unadjusted) | 124 | 37.2 | 0.3 | 49 |
| 5 | 78 | 23.4 | 0.3 | 25 |

TABLE 7B pH dependence of polyphenols extracted from cranberry pomace in 50% ethanol.

| pH | Total Polyphenols (mg/L) | Mass (mg) of TP in Extract | Extract Volume (L) | PACS (mg/L) |
|---|---|---|---|---|
| 2 | 964 | 289.2 | 0.3 | 306 |
| 3 | 591 | 177.3 | 0.3 | 181 |
| 4 (unadjusted) | 469 | 140.7 | 0.3 | 154 |
| 5 | 408 | 122.4 | 0.3 | 123 |

The foregoing Example demonstrates that the amount of total polyphenols and proanthocyanidins present in cranberry pomace extracts is pH-dependent and extractant fluid-dependent. In particular, the data provided in this Example show that the highest amount of these compounds was observed when the pH of a composition comprising plant material (e.g., pureed cranberry pomace) and the extractant fluid (e.g., water or ethanol) was reduced to a pH of about 2. In addition, the data provided in Tables 7A and 7B show that 50% ethanol as an extractant fluid produces a plant extract comprising a more than 4-fold increase in the amount of total polyphenols and a more than 2-fold increase in the amount of proanthocyanidins compared to the plant extract produced with water as the extractant fluid. Further, the data show that 289.2 mg total polyphenols (964 mg/L×0.3 L) was extracted from 30 g wet cranberry pomace with 50% ethanol at pH2 and that 79.8 mg (266 mg/L×0.3 L) was extracted from 30 g wet cranberry pomace with water at pH2.

Example 8

Comparison of 10:1 and 5:1 Cranberry Pomace Extractions in 50% Ethanol at pH 2

The following experiment describes another method for extracting plant-derived polyphenols from cranberry pomace in 50% ethanol (10:1 or 5:1 extraction).

Depectinized cranberry pomace (100 g) was pureed in a Vitamix blender with 1 L of 50% ethanol (10:1 extraction) or 500 mL of 50% ethanol (5:1 extraction). Each puree was adjusted to pH 2 with HCl and the material was then extracted in an 80° C. water bath for 2 hours. The samples were centrifuged at 4,000 rpm for 10 minutes and then filtered through mira cloth to separate the solids from the extract. Recovery was 825 mL for the 10:1 extraction and 275 mL for the 5:1 extraction. The concentrations of total polyphenols (TPs) and proanthocyanidins (PACs) were quantified using the Folin-Ciocalteu method (Singleton and Rossi, 1965) and the DMAC method (Prior et al., 2010), respectively. Results are summarized in Table 8 below.

TABLE 8

Comparison of 10:1 and 5:1 extraction of cranberry pomace

| | PACs (mg/L) | TP (mg/L) | Dry extract (g) | Mass TP (mg) in Extract | % PACs in dry extract | % PACs in wet pomace | % TP in dry extract | % TP in wet pomace | PACs as % of TP |
|---|---|---|---|---|---|---|---|---|---|
| 5:1 | 313 | 950 | 3.76 | 475 | 2.3 | 0.09 | 6.95 | 0.26 | 33 |
| 10:1 | 242 | 725 | 3.77 | 725 | 5.3 | 0.20 | 15.7 | 0.60 | 33 |

The foregoing Example demonstrates that the amount of total polyphenols and proanthocyanidins present in cranberry pomace extracts is slightly increased in a 5:1 extraction of cranberry pomace with 50% ethanol at pH 2 compared to a 10:1 extraction of cranberry pomace with 50% ethanol at pH 2. Further, the data show that 475 mg total polyphenols (950 mg/L×0.5 L) was extracted from 100 g wet cranberry pomace in the 5:1 extraction and that 725 mg (725 mg/L×1 L) was extracted from 100g wet cranberry pomace in the 10:1 extraction. Thus, the majority of plant-derived components (e.g., polyphenols) extractable from plant pomace is achieved with no more than a 5:1 extraction.

Example 9

Comparison of Extracting Different Batches of Cranberry Pomace and Production of an Enriched Substance Comprising Ground Edible Material and Polyphenols The following experiment demonstrates that an enriched substance comprising a ground edible material and a plant-derived component (e.g., polyphenol) from cranberry pomace can be produced using the disclosed methods.

Four different batches (samples A, B, C and D) of depectinized cranberry pomace (100 g) were separately pureed in a Vitamix blender with 1 L of 50% ethanol (10:1 extraction). Each puree was adjusted to pH 2 with HCl and the material was then extracted in an 80° C. water bath for 2 hours. The samples were centrifuged at 4,000 rpm for 10 minutes and then filtered through mira cloth to separate the solids from the extract. Volumes of recovered extract were 0.83, 0.80, 0.75 and 0.84 L for samples A, B, C, and D, respectively. The concentrations of total polyphenols (TP)

and proanthocyanidins (PACs) were quantified using the Folin-Ciocalteu method (Singleton and Rossi, 1965) and the DMAC method (Prior et al., 2010), respectively. The concentrations of TPs and PACs in the cranberry pomace extract are summarized in Table 9; the concentration multiplied by the extract volume was used to determine the amount of PACs and TPs in the extract.

For each extract, two 1 mL aliquots were dried in a speed vacuum and the average dry weight per mL was determined to estimate the total amount of dried extract in each extract volume. The dry weight of each cranberry pomace sample was determined by freeze-drying 10-11 g of wet pomace. The average water content was 73.3±1.0% and the average dry weight per 100 g of wet pomace was 26.7±1 g.

The percentage TPs and PACs in the dried extract, the wet pomace and the dry pomace were calculated as follows: mass of PACs or TPs divided by the mass of any of the dried extract, wet pomace or dry pomace. Results are summarized in Table 9.

Soy protein isolate (SPI) was then added to the liquid cranberry extract and co-dried. The extract from samples A, B, C and D were pooled (3.22 L) and the total extract dryweight was calculated to be 19.1 g containing 3.04 g of TP. To make a SPI/10% total polyphenols from cranberry pomace, the amount of SPI added to the cranberry extract was calculated as follows:

First, the total mass necessary to produce an enriched substance comprising 10% total polyphenols was calculated.

$$\frac{TP \text{ in extract (g)}}{\text{Total Mass (g)}} = \frac{10\%}{100\%}$$

$$\frac{3.04 \text{ g } TP \text{ in extract}}{X \text{ Total Mass (g)}} = \frac{10\%}{100\%}$$

$$X = 30.4 \text{ g Total Mass}$$

Second, the difference between the total mass calculated above (30.4 g) and the amount of soy protein isolate (SPI) required to reach the total mass was determined by subtracting the mass of the dried extract from the total mass (i.e., 30.4 g total mass−19.1 g dried extract). The amount of soy protein isolate (SPI) required was determined to be 11.3 g.

The 11.3 g of SPI was added to the cranberry pomace extract and the solvent (50% ethanol) was removed by rotary evaporation. The remaining slurry was freeze-dried to yield a flowable powder composed of cranberry polyphenols complexed or sorbed to SPI.

TABLE 9

Total polyphenols and proanthocyanidins in cranberry pomace

|   | PACs (mg/L) | TP (mg/L) | Dry extract (g) | % PACs in dry extract | % PACs in wet pomace | % PACs in dry pomace | % TP in dry extract | % TP in wet pomace | % TP in dry pomace |
|---|---|---|---|---|---|---|---|---|---|
| A | 453 | 882 | 5.4 | 6.9 | 0.376 | 1.4 | 13.5 | 0.7 | 2.7 |
| B | 452 | 934 | 4.9 | 7.4 | 0.362 | 1.4 | 15.3 | 0.7 | 3.0 |
| C | 580 | 1026 | 4.6 | 9.3 | 0.435 | 1.6 | 16.6 | 0.8 | 2.8 |
| D | 533 | 948 | 4.2 | 10.7 | 0.448 | 1.7 | 19.0 | 0.8 | 3.0 |

This Example demonstrates that an enriched substance comprising ground edible material that comprises 10% total polyphenols can be produced by combining ground edible material, in this instance soy protein isolate, with a plant material extracted in 50% ethanol at a reduced pH.

Example 10

Extraction of Maqui Pomace in 50% Ethanol at pH 3 Enhanced Extraction of Polyphenols from the Pomace The following experiment was performed to compare the amount of polyphenols present in a maqui pomace extract obtained from extraction with 50% ethanol at varying pH.

Depectinized maqui pomace (30 g) was pureed in a Vitamix blender with 300 mL of water or 50% ethanol (10:1 extraction). The puree was aliquoted into 40 mL volumes and the pH was adjusted from 5 to 2, 3 or 4 with HCl. The material was then extracted in an 80° C. water bath for 2 hours. The samples were centrifuged at 4,000 rpm for 10 minutes to separate the solids from the extract. The concentration of total polyphenols (TPs), proanthocyanidins (PACs) and anthocyanins (ACNs) was quantified using the Folin-Ciocalteu method (Singleton and Rossi, 1965), DMAC method (Prior et al., 2010) and the pH differential method (Lee et al., 2005), respectively. Results are summarized below in Table 10.

TABLE 10 pH dependence of polyphenols extracted from Maqui berry pomace in 50% ethanol

| pH | Anthocyanins (mg/L) | Extract Volume (L) | Mass (mg) TP in Extract | PACS (mg/L) | Total Polyphenols (mg/L) |
|---|---|---|---|---|---|
| 2 | 209 | 0.3 | 404.1 | 719 | 1347 |
| 3 | 241 | 0.3 | 441.6 | 787 | 1472 |
| 4 | 237 | 0.3 | 250.2 | 282 | 834 |
| 5 (unadjusted) | 192 | 0.3 | 112.2 | 70 | 374 |

The Example shows that the highest concentrations of polyphenols, proanthocyanidins and anthocyanins were obtained by extracting the maqui pomace at pH 3. Further, the data show that 441.6 mg total polyphenols (1472 mg/L× 0.3 L) was extracted from 30 g wet maqui pomace with 50% ethanol at pH 3.

Example 11

Method of Producing an Enriched Substance

The following experiment demonstrates that an enriched substance comprising a ground edible material and a plant-derived component from maqui pomace can be produced using the disclosed methods.

Depectinized maqui pomace (200 g) was pureed in a Vitamix blender with 2 L of 50% ethanol (10:1 extraction). The puree was adjusted from pH 5 to pH 3 and the material was then extracted in an 80° C. water bath for 2 hours. The extract was filtered through mira cloth 4 times to remove solids and particulates. The concentration of total polyphenols (TPs) and anthocyanins (ACNs) was quantified using the Folin-Ciocalteu method (Singleton and Rossi, 1965) and the pH differential method (Lee et al., 2005), respectively. The concentration of total polyphenols in the maqui pomace extract was 1222 mg/L and the concentration of anthocyanins was 334 mg/L. A total of 1.7 L of extract was recovered from the 2 L extraction volume.

To determine the extract dry weight per mL, three samples of 3 mL were dried in a speed vacuum and the average dry weight was determined to be 3.7±0.03 mg/mL. The dry weight of the maqui pomace was determined by freeze-drying 20 g of wet pomace the dry weight was found to be 8.0 g. Thus, the water content of the wet pomace was 60%. Based on these determinations, the dry weight of 200 g of wet pomace was calculated to be 80 g.

The percent yield of total polyphenols and anthocyanins from the dried extract, the wet pomace and the dry pomace was calculated and is summarized below in Table 11.

TABLE 11

Total polyphenols and anthocyanins in maqui pomace.

| ACNs (mg/L) | TP (mg/L) | Dry extract (g) | Extract Volume (L) | Mass (g) TP in Extract | % ACN in dry extract | % ACN in wet pomace | % ACN in dry pomace | % TP in dry extract | % TP in dry pomace | % TP in wet pomace |
|---|---|---|---|---|---|---|---|---|---|---|
| 334 | 1222 | 6.30 | 1.7 | 2.1 | 9.0 | 0.28 | 0.71 | 33.0 | 2.6 | 1.04 |

Soy protein isolate (SPI) was added to the liquid maqui extract and co-dried. For example, based on a dry extract weight of 3.7 mg/mL, 1.7 L of maqui extract could yield 6.3 g of dried extract containing 2.1 g of total polyphenols. The amount of SPI added to the maqui extract was calculated as follows:

First, the total mass necessary to produce an enriched substance comprising 10% total polyphenols was calculated.

$$\frac{TP \text{ in extract (g)}}{\text{Total Mass (g)}} = \frac{10\%}{100\%}$$

$$\frac{2.1 \text{ g } TP \text{ in extract}}{X \text{ Total Mass (g)}} = \frac{10\%}{100\%}$$

$$X = 21 \text{ g Total Mass}$$

Second, the difference between the total mass calculated above (21 g) and the amount of soy protein isolate (SPI) required to reach the total mass was determined by subtracting the mass of the dried extract from the total mass (i.e., 21 g total mass−6.3 g dried extract). The amount of soy protein isolate (SPI) required was determined to be 14.7 g.

The 14.7 g of SPI was added to the 1700 mL of Maqui extract and the solvent (50% ethanol) was removed by rotary evaporation. The remaining slurry was freeze-dried to yield a flowable powder composed of Maqui polyphenols complexed or sorbed to SPI.

Like Example 10, this Example demonstrates that an enriched substance comprising ground edible material that comprises 10% total polyphenols can be produced by combining ground edible material, in this instance soy protein isolate, with another plant material extracted in 50% ethanol at a reduced pH, such as pH 3.

Example 12

Extraction of Blueberry Pomace in 50% Ethanol at pH 2 Enhanced Extraction of Polyphenols The following experiment was performed to compare the amount of polyphenols present in a blueberry pomace extract obtained from extraction with 50% ethanol at varying pH.

Depectinized blueberry pomace (30 g) was pureed in a Vitamix blender with 300 mL of 50% ethanol (10:1 extraction). The puree was aliquoted into 40 mL volumes and the pH was adjusted from 4 to 2, 3 and 5 with HCl or NaOH. The material was then extracted in an 80° C. water bath for 2 hours. The samples were centrifuged at 4,000 rpm for 10 minutes to separate the solids from the extract. The concentration of total polyphenols was quantified using the Folin-Ciocalteu method (Singleton and Rossi, 1965). Results are summarized below in Table 12.

TABLE 12 pH dependence of polyphenols extracted from grape pomace in 50% ethanol

| pH | Total Polyphenols (mg/L) | Extract Volume (L) | Mass (mg) TP in extract |
|---|---|---|---|
| 2 | 1575 | 0.3 | 472.5 |
| 3 | 1246 | 0.3 | 373.8 |
| 4.3 (unadjusted) | 890 | 0.3 | 267 |
| 5 | 787 | 0.3 | 236.1 |

These data demonstrate that the amount of total polyphenols present in blueberry extracts is pH-dependent. In particular, the data provided in this Example establish that the highest amount of these compounds was observed when the pH of a composition comprising plant material (e.g., pureed blueberry pomace) and the extractant fluid (e.g., 50% ethanol) was reduced to a pH of about 2, although significant increases in TP yield were seen at all pH values less than or equal to pH 5.

Example 13

Method of Making an Enriched Substance

The following experiment demonstrates that an enriched substance comprising a ground edible material and a plant-derived component from blueberry pomace can be produced using the disclosed methods.

Depectinized blueberry pomace (200 g; Milne) was pureed in a Vitamix blender with 2 L of 50% ethanol (10:1 extraction) or 1 L of 50% ethanol (5:1 extraction). Each puree was adjusted from pH 4.3 to pH 2 with concentrated sulfuric acid (18 M H$_2$SO$_4$) and then extracted in an 80° C. water bath for 2 hours. The extract was filtered through mira cloth. For the 10:1 extraction, 1480 mL of extract was recovered and 630 mL was recovered for the 5:1 extraction. The concentration of total polyphenols (TP) and anthocyanins (ACNs) was quantified using the Folin-Ciocalteu method (Singleton and Rossi, 1965) and the pH differential method (Lee et al., 2005), respectively. Results are summarized in Table 13.

The extract dry weight per mL was determined for both extracts. In each case three samples of 1 mL each were dried in a speed vacuum and the average dry weight was determined to be 9.6±1.2 mg/mL for the 10:1 extraction and 15.2±1.8 for the 1:5 extraction. The dry weight of the blueberry pomace was determined by freeze-drying 20 g of wet pomace; the water content was determined to be 52.1%. The dry weight of 200 g of wet pomace was estimated to be 95.8 g. The percent yield of total polyphenols and anthocyanins from the dried extract residue, the wet pomace and the dry pomace was calculated and is also summarized in Table 13.

Soy protein isolate (SPI) was added to the liquid blueberry extract and co-dried. In the 5:1 extraction, e.g., 630 mL of blueberry extract yielded 9.6 g of dried extract containing 1.18 g of total polyphenols (i.e., 1867 mg/L×0.63 L/1000). Therefore, to make a ground edible material containing 5% total polyphenols from blueberry pomace, the amount of SPI to be added to the blueberry extract was calculated as follows:

First, the total mass necessary to produce an enriched substance comprising 5% total polyphenols was calculated.

$$\frac{TP \text{ in extract (g)}}{\text{Total Mass (g)}} = \frac{5\%}{100\%}$$

$$\frac{1.18 \text{ g } TP \text{ in extract}}{X \text{ Total Mass (g)}} = \frac{5\%}{100\%}$$

$$X = 23.6 \text{ g Total Mass}$$

Second, the difference between the total mass calculated above (23.6 g) and the amount of soy protein isolate (SPI) required to reach the total mass was determined by subtracting the mass of the dried extract from the total mass (i.e., 23.6 g total mass−9.6 g dried extract). The amount of soy protein isolate (SPI) required was determined to be 14 g.

The 14 g of SPI was added to the 630 mL of blueberry pomace extract and the solvent (50% ethanol) was removed by rotary evaporation. The remaining slurry was freeze-dried to yield a flowable powder composed of blueberry polyphenols complexed or sorbed to SPI.

Like Example 6, this Example demonstrates that a ground edible material comprising approximately 5% total polyphenols can be produced by combining ground edible material, in this instance soy protein isolate, with another plant material extracted in 50% ethanol at a reduced pH. Further, the data show that 1.18 g total polyphenols (1867 mg/L× 0.63 L/1000) was extracted from 200 g wet blueberry pomace in the 5:1 extraction and that 1.99 g total polyphenols (1344 mg/L×1.48 L/1000) was extracted from 200 g wet blueberry pomace in the 10:1 extraction.

Example 14

Method of Making an Enriched Substance

The following experiment demonstrates that an enriched substance comprising a ground edible material and a plant-derived component from cranberry pomace can be produced using the disclosed methods.

Depectinized cranberry pomace (300 g) was pureed in a Vitamix blender with 3 L of 75% ethanol (10:1 extraction). The puree was adjusted to pH 2 with HCl and the material was then extracted in a rotary evaporator spinning at 100 rpm in an 80° C. water bath for 2 hours. The slurry was cooled to 4° C. The samples were centrifuged at 4,000 rpm for 25 minutes and then filtered through mira cloth to separate the solids from the extract. Recovery was 2.98 L. The concentrations of total polyphenols (TPs) and proanthocyanidins (PACs) were quantified using the Folin-Ciocalteu method (Singleton and Rossi, 1965) and the DMAC method (Prior et al., 2010), respectively. The concentration of TPs in the cranberry pomace extract was 877 mg/L and the concentration of PACs was 487 mg/L. A total of 1.7 L of extract was recovered from the 2.98 L extraction volume.

To determine the extract dry weight per mL, two samples of 100 μL were dried in a speed vacuum and the average dry weight was determined to be 5.73 mg/mL. The dry weight of the cranberry pomace was determined by freeze-drying 10.5 g of wet pomace and the dry weight was found to be 2.88 g. Thus, the water content of the wet pomace was 73%. Based on these determinations, the dry weight of 100 g of wet pomace was calculated to be 26.64 g.

The percentages of TPs and PACs from the dried extract, the wet pomace and the dry pomace were calculated and are summarized in Table 14.

TABLE 13

Total polyphenols and anthocyanins in blueberry pomace.

|  | ACNs (mg/L) | TP (mg/L) | Dry extract (g) | Mass (g) TP in extract | % ACNs in dry extract | % ACNs in wet pomace | % ACNs in dry pomace | % TP in dry extract | % TP in dry pomace | % TP in wet pomace |
|---|---|---|---|---|---|---|---|---|---|---|
| 5:1 | 134 | 1867 | 9.6 | 1.18 | 0.88 | 0.04 | 0.09 | 12.3 | 1.23 | 0.59 |
| 10:1 | 75 | 1344 | 14.2 | 1.99 | 0.78 | 0.06 | 0.12 | 14.0 | 1.0 | 2.0 |

TABLE 14

Total polyphenols and PACs in cranberry pomace extracted with 75% ethanol.

| PACs (mg/L) | TP (mg/L) | Dry extract (g) | Extract Volume (L) | Mass (g) TP in Extract | % PACs in dry extract | % PACs in wet pomace | % PACs in dry pomace | % TP in dry extract | % TP in wet pomace | % TP in dry pomace |
|---|---|---|---|---|---|---|---|---|---|---|
| 487 | 877 | 17.07 | 2.98 | 2.61 | 8.5 | 0.48 | 1.82 | 15.3 | 0.87 | 3.27 |

The extract was split into 4 equal samples of 0.745 L of extract. Oat bran, wheat bran, wheat germ or whey protein was added to each 0.745 L of cranberry liquid extract and co-dried. For example, based on a dry extract weight of 17.07 g per 2.98 L of extract, 0.754 L of cranberry extract could yield 4.268 g of dried extract containing 0.6525 g of total polyphenols. The amount of oat bran, wheat bran, wheat germ or whey protein added to the cranberry extract was calculated as follows:

First, the total mass necessary to produce an enriched substance comprising 10% total polyphenols was calculated.

$$\frac{TP \text{ in extract (g)}}{\text{Total Mass (g)}} = \frac{10\%}{100\%}$$

$$\frac{0.6525 \text{ g } TP \text{ in extract}}{X \text{ Total Mass (g)}} = \frac{10\%}{100\%}$$

$$X = 6.525 \text{ g Total Mass}$$

Second, the difference between the total mass calculated above (6.525 g) and the amount of matrix (i.e., oat bran, wheat bran, wheat germ or whey protein) required to reach the total mass was determined by subtracting the mass of the dried extract from the total mass (i.e., 6.525 g total mass– 4.268 g dried extract). The amount of oat bran, wheat bran, wheat germ or whey protein required was determined to be 2.26 g.

The 2.26 g of each matrix, or ground edible material, was added to 0.745 L of cranberry extract and the solvent (70% ethanol) was removed by rotary evaporation. The remaining slurry was freeze-dried to yield a flowable powder composed of cranberry polyphenols complexed or sorbed to oat bran, wheat bran, wheat germ or whey protein.

Like Example 10, this Example demonstrates that an enriched substance comprising ground edible material that comprises 10% total polyphenols can be produced by combining ground edible material, in this instance oat bran, wheat bran, wheat germ or whey protein, with another plant material extracted in 75% ethanol at a reduced pH, such as pH 2.

All of the U.S. patents, U.S. patent application publications, U.S. patent applications, foreign patents, foreign patent applications and non-patent publications referred to in this specification and/or listed in the Application Data Sheet, are incorporated herein by reference, in their entireties.

From the foregoing it will be appreciated that, although specific embodiments of the invention have been described herein for purposes of illustration, various modifications may be made without deviating from the spirit and scope of the invention.

REFERENCES

Lee, J., Durst, R. W., and Wrolstad, R. E. (2005). Determination of total monomeric anthocyanin pigment content of fruit juices, beverages, natural colorants, and wines by the pH differential method: collaborative study. J AOAC Int 88, 1269-1278.

Prior, R. L., Fan, E., Ji, H., Howell, A., Nio, C., Payne, M. J., and Reed, J. (2010). Multi-laboratory validation of a standard method for quantifying proanthocyanidins in cranberry powders. J Sci Food Agric 90, 1473-1478.

Singleton, V. L., and Rossi, J. A. (1965). Colorimetry of total phenolics with phosphomolybdic-phosphotungstic acid reagents. Am J Enol Vitic 16, 144-158.

What is claimed is:

1. A method of making an enriched substance comprising a plant-derived component, the method comprising:
    (a) combining plant juice comprising the plant-derived component with an edible powder to form a plant juice-edible powder admixture wherein the plant-derived component is sorbed to the edible powder;
    (b) co-drying the plant juice-edible powder admixture in a drying apparatus, thereby producing an enriched substance comprising the plant-derived component from the plant juice and the edible powder.

2. The method of claim 1, wherein the plant juice is a plant extract.

3. The method of claim 2, wherein the plant extract is produced by contacting plant material with an extractant fluid at a pH less than pH 4, incubating the plant material in the extractant fluid for a time sufficient to extract a plant-derived component and collecting the fluid to obtain a plant extract comprising the plant-derived component.

4. The method of claim 3, wherein the plant material is selected from the group consisting of bark, a flower, a berry, a seed, a root, a nut, a leaf, a stem and mixtures thereof.

5. The method of claim 3, wherein the plant material is pomace.

6. The method of claim 5, wherein the pomace is cranberry pomace, grape pomace, maqui pomace or blueberry pomace.

7. The method of claim 1, wherein the plant-derived component is a polyphenol.

8. The method of claim 7, wherein the polyphenol is selected from the group consisting of an anthocyanin and a proanthocyanidin.

9. The method of claim 1, wherein the edible powder is a plant flour.

10. The method of claim 9, wherein the plant flour is selected from the group consisting of soybean flour, soy protein isolate, wheat flour, almond flour, amaranth flour, brown rice flour, oat flour, buckwheat flour, cassava flour, chestnut flour, chickpea flour, chuno flour, corn flour, cornstarch, glutinous rice flour, noodle flour, hazelnut flour, walnut flour, pea flour, bean flour, peanut flour, potato starch flour, rice flour, rye flour, tapioca flour, teff flour, arrowroot flour, taro flour, quinoa flour, mulga flour, ironweed flour, umbrella bush flour, tjuntjula flour, wakalpulka flour, witchetty bush flour, wiry wattle flour, Mitchell grass flour, nardoo flour, coconut flour, old man saltbush flour and wangunu flour.

11. The method of claim 1, wherein the edible powder is selected from the group consisting of soybean flour, soy protein isolate, pea protein isolate, wheat bran, wheat germ, rice bran, rice germ and oat bran.

12. The method of claim 1, wherein the edible powder is selected from the group consisting of milk powder, egg powder, whey protein, casein protein, gluten and yeast powder.

13. The method of claim 1, where the drying apparatus is a tray dryer, a vacuum oven or an oven.

14. The method of claim 1, wherein the co-drying in step (b) is freeze drying.

15. A method of making an enriched substance, the method comprising
   (a) combining a pomace extract comprising a plant-derived component and an extractant fluid, with an edible powder to form an admixture wherein the plant-derived component is sorbed to the edible powder;
   (b) removing extractant fluid from the admixture; and
   (c) co-drying the admixture in a drying apparatus, thereby producing an enriched substance comprising the plant-derived component from the edible powder.

16. The method of claim 15, wherein the co-drying step in step (c) is freeze-drying.

* * * * *